[19] United States Patent
Phal et al.

(10) Patent No.: US 11,499,910 B2
(45) Date of Patent: Nov. 15, 2022

(54) VIBRATIONAL CIRCULAR DICHROISM INFRARED SPECTROSCOPIC IMAGING MICROSCOPE

(71) Applicant: The Board of Trustees of the University of Illinois, Urbana, IL (US)

(72) Inventors: Yamuna Phal, Champaign, IL (US); Kevin Lee Yeh, Corvallis, OR (US); Rohit Bhargava, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 17/377,096

(22) Filed: Jul. 15, 2021

(65) Prior Publication Data

US 2022/0018759 A1 Jan. 20, 2022

Related U.S. Application Data

(60) Provisional application No. 63/052,785, filed on Jul. 16, 2020.

(51) Int. Cl.
*G01J 4/00* (2006.01)
*G01N 21/19* (2006.01)
(Continued)

(52) U.S. Cl.
CPC ............. *G01N 21/19* (2013.01); *G01J 3/108* (2013.01); *G01J 3/2823* (2013.01); *G01J 3/433* (2013.01);
(Continued)

(58) Field of Classification Search
CPC ........ G01N 21/19; G01N 21/23; G01N 21/39; G01N 2021/216; G01J 3/108;
(Continued)

(56) References Cited

U.S. PATENT DOCUMENTS 3,446,557 A 5/1969 Wilkinson
3,540,827 A 11/1970 Badoz et al.
(Continued)

OTHER PUBLICATIONS

Bharbava, R., "Infrared Spectroscopic Imaging: The next Generation", Appl. Spectrosc. 2012, 66 (10), 1091-1120.
(Continued)

*Primary Examiner* — Md M Rahman
(74) *Attorney, Agent, or Firm* — Crowell & Moring LLP

(57) ABSTRACT

Methods and apparatus for obtaining a vibrational circular dichroism (VCD) image using a discrete frequency infrared (DFIR) microscope are disclosed. The method includes generating a pulsed laser beam comprising a spectral frequency, which may be tunable; modulating the laser beam to generate circularly polarized light; illuminating a sample and collecting, and detecting an optical signal transmitted or transflected from the location of the sample. The detected signal is demodulated at, for example, both the pulse frequency and the sum or difference of the pulse frequency and the modulating frequency to obtain an intensity value that correspond to the absorbance, and a polarization-dependent value that corresponds to the VCD. Other configurations of the apparatus may be employed to measure VCB and VLD.

22 Claims, 13 Drawing Sheets

(51) Int. Cl.
*G01N 21/23* (2006.01)
*G01N 21/39* (2006.01)
*G01J 3/28* (2006.01)
*G01J 3/433* (2006.01)
*G01J 3/10* (2006.01)
*G01J 3/447* (2006.01)

(52) U.S. Cl.
CPC .............. *G01J 3/447* (2013.01); *G01N 21/23* (2013.01); *G01N 21/39* (2013.01)

(58) Field of Classification Search
CPC .......... G01J 3/2823; G01J 3/433; G01J 3/447; G01J 2003/104; G01J 2003/106; G02B 21/0068
USPC ........................................................ 356/364
See application file for complete search history.

(56) References Cited

U.S. PATENT DOCUMENTS

| | | | |
|---|---|---|---|
| 6,118,536 A | 9/2000 | Sakamoto et al. | |
| 6,480,277 B1 | 11/2002 | Nafie | |
| 7,012,695 B2 | 3/2006 | Maier et al. | |
| 7,378,283 B2 | 5/2008 | Nafie et al. | |
| 7,456,956 B2 | 11/2008 | Jiang et al. | |
| 7,480,049 B2 | 1/2009 | Manolopoulos et al. | |
| 7,522,283 B2 | 4/2009 | Nafie et al. | |
| 7,768,647 B2 | 8/2010 | Reeve et al. | |
| 7,935,906 B2 | 5/2011 | Kibar et al. | |
| 8,542,357 B2 | 9/2013 | Takahashi et al. | |
| 8,593,630 B2 | 11/2013 | Bhargava et al. | |
| 9,329,085 B2 | 5/2016 | Kotidis et al. | |
| 2014/0093126 A1* | 4/2014 | Roberts ................... | G06V 20/36 382/103 |
| 2014/0093249 A1* | 4/2014 | Roberts ................ | H04B 10/116 398/127 |

OTHER PUBLICATIONS

Wrobel, T. P.; Kole, M. R.; Bhargave, R. Emerging Trends and Opportunities in Discrete Frequency Infrared and Raman Spectroscopic Imaging. Spectroscopy 2016, 31 (6), 28-44.
Wrobel, T. P.; Bhargave, R. Infrared Spectroscopic Imaging Advances as an Analytical Technology for Biomedical Sciences. Anal. Chem. 2018, 90 (3), 1444-1463.
Davis, B. J. B. B. J.; Carney, P. S. P. S.; Bhargava, R. Theory of Midinfrared Absorption Microspectroscopy: I. Homogeneous Samples. Anal. Chem. 2010, 82 (9), 3474-3486.
Davis, B.; Carney, P.; Bhargava, R. Theory of Mid-Infrared Absorption Microspectroscopy: II. Heterogeneous Samples. Anal. Chem. 2010, 82 (9), 3487-3499.
Baker, M. J.; Trevisan, J.; Bassan, P.; Bhargava, R.; Butler, H. J.; Dorling, K. M.; Fielden, P. R.; Fogarty, S. W.; Fullwood, N. J.; Heys, K. a; et al. Using Fourier Transform IR Spectroscopy to Analyze Biological Materials. Nat. Protoc. 2014, 9 (8), 1771-1791.
Bhargava, R.; Wang, S.; Koenig, J. L. FTIR Microspectroscopy of Polymeric Systems. Adv. Polym. Sci. 2003, 163, 137-191.
Tiwari, S.; Reddy, V. B.; Bhargava, R.; Raman, J. Computational Chemical Imaging for Cardiovascular Pathology: Chemical Microscopic Imaging Accurately Determines Cardiac Transplant Rejection. PLoS One 2015, 10 (5), e0125183.
Bhargava, R.; Fernandez, D. C.; Hewitt, S. M.; Levin, I. W. High Throughput Assessment of Cells and Tissues: Bayesian Classification of Spectral Metrics from Infrared Vibrational Spectroscopic Imaging Data. Biochim. Biophys. Acta 2006, 1758 (7), 830-845.
Guo, B.; Wang, Y.; Peng, C.; Luo, G. P.; Le, H. Q., "Multi-Wavelength Mid-Infrared Micro-Spectral Imaging using Semiconductor Lasers", 2003, 57 (7), 811-822.
Kole, M. R.; Reddy, R. K.; Schulmerich, M. V; Gelber, M. K.; Bhargava, R. Discrete Frequency Infrared Microspectroscopy and Imaging with a Tunable Quantum Cascade Laser. Anal. Chem. 2012, 84 (23), 10366-10372.

Bassan, P.; Weida, M. J.; Rowlette, J.; Gardner, P. Large Scale Infrared Imaging of Tissue Micro Arrays (TMAs) Using a Tunable Quantum Cascade Laser (QCL) Based Microscope. Analyst 2014, 139 (16), 3856-3859.
Yeh, K.; Kenkel, S.; Liu, J. N.; Bhargava, R. Fast Infrared Chemical Imaging with a Quantum Cascade Laser. Anal. Chem. 2015, 87 (1), 485-493.
Kröger, N.; Egl, A.; Engel, M.; Gretz, N.; Haase, K.; Herpich, I.; Kränzlin, B.; Neudecker, S.; Pucci, A.; Schönhals, A.; et al. Quantum Cascade Laser-based Hyperspectral Imaging of Biological Tissue. J. Biomed. Opt. 2014, 19 (11), 111607.
Kuepper, C.; Kallenbach-Thieltges, A.; Juette, H.; Tannapfel, A.; Großerueschkamp, F.; Gerwert, K. Quantum Cascade Laser-Based Infrared Microscopy for Label-Free and Automated Cancer Classification in Tissue Sections. Sci. Rep. 2018, 8 (1), 1-10.
Bassan, P.; Sachdeva, A.; Kohler, A.; Hughes, C.; Henderson, A.; Boyle, J.; Shanks, J. H.; Brown, M.; Clarke, N. W.; Gardner, P. FTIR Microscopy of Biological Cells and Tissue: Data Analysis Using Resonant Mie Scattering (RMieS) EMSC Algorithm. Analyst 2012, 137 (6), 1370-1377.
Bambery, K. R.; Wood, B. R.; McNaughton, D. Resonant Mie Scattering (RMieS) Correction Applied to FTIR Images of Biological Tissue Samples. Analyst 2012, 137 (1), 126-132.
Schönhals, A.; Kröger-Lui, N.; Pucci, A.; Petrich, W., On the Role of Interference in Laser-Based Mid-Infrared Widefield Microspectroscopy. J. Biophotonics 2018, e201800015.
Ran, S.; Berisha, S.; Mankar, R.; Shih, W.-C.; Mayerich, D. Mitigating Fringing in Discrete Frequency Infrared Imaging Using Time-Delayed Integration. Biomed. Opt. Express 2018, 9 (2), 832.
Yeh, K.; Bhargava, R. Discrete Frequency Infrared Imaging Using Quantum Cascade Lasers for Biological Tissue Analysis. In SPIE; Mahadevan-Jansen, A., Petrich, W., Eds.; 2016; vol. 9704, p. 970406.
Mittal, S.; Yeh, K.; Leslie, L. S.; Kenkel, S.; Kajdacsy-Balla, A.; Bhargava, R. Simultaneous Cancer and Tumor Microenvironment Subtyping Using Confocal Infrared Microscopy for All-Digital Molecular Histopathology. Proc. Natl. Acad. Sci. 2018, 115 (25), E5651-E5660.
Tiwari, S.; Raman, J.; Reddy, V.; Ghetler, A.; Tella, R. P.; Han, Y.; Moon, C. R.; Hoke, C. D.; Bhargava, R. Towards Translation of Discrete Frequency Infrared Spectroscopic Imaging for Digital Histopathology of Clinical Biopsy Samples. Anal. Chem. 2016, 88 (20), 10183-10190.
Lu, F.; Jin, M.; Belkin, M. a. Tip-Enhanced Infrared Nanospectroscopy via Molecular Expansion Force Detection. Nat. Photonics 2014, 8 (4), 307-312.
Kenkel, S.; Mittal, A.; Mittal, S.; Bhargava, R., Probe-Sample Interaction-Independent Atomic Force Microscopy-Infrared Spectroscopy: Toward Robust Nanoscale Compositional Mapping. Anal. Chem. 2018, 90 (15), 8845-8855.
Dazzi, A.; Glotin, F.; Carminati, R. Theory of Infrared Nanospectroscopy by Photothermal Induced Resonance. J. Appl. Phys. 2010, 107 (12).
Ramer, G.; Aksyuk, V. A.; Centrone, A.; Quantitative Chemical Analysis at the Nanoscale Using the Photothermal Induced Resonance Technique. Anal. Chem. 2017, 89 (24), 13524-13531.
Pleitez, M. A.; Lieblein, T.; Bauer, A.; Hertzberg, O.; Von Lilienfeld-Toal, H.; Mäntele, W. In Vivo Noninvasive Monitoring of Glucose Concentration in Human Epidermis by Mid-Infrared Pulsed Photoacoustic Spectroscopy. Anal. Chem. 2013, 85 (2), 1013-1020.
Zhang, D.; Li, C.; Zhang, C.; Slipchenko, M. N.; Eakins, G.; Cheng, J. X. Depth-Resolved Mid-Infrared Photothermal Imaging of Living Cells and Organisms with Submicrometer Spatial Resolution. Sci. Adv. 2016, 2 (9), 1-8.
Berer, T.; Brandstetter, M.; Hochreiner, A.; Langer, G.; Märzinger, W.; Burgholzer, P.; Lendl, B. Remote Mid-Infrared Photoacoustic Spectroscopy with a Quantum Cascade Laser. Opt. Lett. 2015, 40 (15), 3476.
Tiwari, S.; Raman, J.; Reddy, V.; Dawson, M.; Bhargava, R., Translation of Infrared Chemical Imaging for Cardiovascular Evaluation. Prog. Biomed. Opt. Imaging—Proc. SPIE 2016, 9704.
Griffiths, P.; Haseth, J. A. De. Fourier Transform Infrared Spectrometry, 2nd Ed.; John Wiley & Sons: Hoboken, NJ, 2007.

(56) References Cited

OTHER PUBLICATIONS

Bhargava, R.; Wall, B. G.; Koenig, J. L. Comparison of the FT-IR Mapping and Imaging Techniques Applied to Polymeric Systems. Appl. Spectrosc. 2000, 54 (4), 470-479.
Lambrechts, P.; Boerlage, M.; Steinbuch, M. Trajectory Planning and Feedforward Design for Electromechanical Motion Systems. Control Eng. Pract. 2005, 13 (2), 145-157.
Mayerich, D.; van Dijk, T.; Walsh, M. J.; Schulmerich, M. V.; Scott Carney, P.; Bhargava, R. On the Importance of Image Formation Optics in the Design of Infrared Spectroscopic Imaging Systems. Analyst 2014, 139 (16), 4031-4036.
Jágerská, J.; Jouy, P.; Tuzson, B.; Looser, H.; Hugi, a; Mangold, M.; Soltic, P.; Faist, J.; Emmenegger, L. Multi-Color Laser Spectroscopy with a Dual-Wavelength Quantum Cascade Laser. 2014, No. 2, 3-4.
Jouy, P.; Bonetti, Y.; Hans, K.; Gianella, M.; Sigrist, M. W.; Mangold, M.; Tuzson, B.; Emmenegger, L.; Wagli, P.; Homsy, A.; et al. Multi-Wavelength QCL Based MIR Spectroscopy for Fluids and Gases. 2013 Conf. Lasers Electro-Optics 2013, 2 pp.-2 pp.
Gmachl, C.; Sivco, D. L.; Baillargeon, J. N.; Hutchinson, A. L.; Capasso, F.; Cho, A. Y. Quantum Cascade Lasers with a Heterogeneous Cascade: Two-Wavelength Operation. Appl. Phys. Lett. 2001, 79 (5), 572-574.
Rauter, P.; Capasso, F. Multi-Wavelength Quantum Cascade Laser Arrays. Laser Photonics Rev. 2015, 9 (5), 452-477.
Schwaighofer, A., et al., Quantum cascade laser (QCLs) in biomedical spectroscopy, Chem. Soc. Rev. 2017, pp. 5903-5924.
Kimber, J. A., & Kazarian, S. G., "Spectroscopic imaging of biomaterials and biological systems with FTIR microscopy or with quantum cascade lasers", Analytical and bioanalytical chemistry 2017, pp. 5813-5820.
Yeh K., Schulmerich M., Bhargava R. "Mid-infrared microspectroscopic imaging with a quantum cascade laser" Proceedings of SPIE 2013, pp. 87260E-87260E7.
Yeh, K.; Lee, D.; Bhargava, R. "Multicolor Discrete Frequency Infrared Spectroscopic Imaging", Analytical Chemistry 2019, 91 (3), pp. 2177-2185.
Lüdeke, S.; Pfeifer, M.; Fischer, P. "Quantum-Cascade Laser-Based Vibrational Circular Dichroism", Journal of the American Chemical Society 2011, 133 (15), pp. 5704-5707.
Lu, X.; Li, H., Nafie; J. W., Pazderka; T., Pazderková, M.; Dukor, R. K.; & Nafie, L. A.; "A Vibrational Circular Dichroism Microsampling Accessory: Mapping Enhanced Vibrational Circular Dichroism in Amyloid Fibril Films", 2017, pp. 1117-1126.
Sato, H.; Yamagishi, A.; Shimizu, M.; Watanabe, K.; Koshoubu, J.; Yoshida, J. & Kawamura, I.; "Mapping of Supramolecular Chirality in Insect Wings by Microscopic Vibrational Circular Dichroism Spectroscopy: Heterogeneity in Protein Distribution", The Journal of Physical Chemistry Letters, 2021, pp. 7733-7737.
Sato, H.; Shimizu, M.; Watanabe, K.; Yoshida, J.; Kawamura, I.; & Koshoubu, J. "Multidimensional Vibrational Circular Dichroism Apparatus Equipped with Quantum Cascade Laser and Its Use for Investigating Some Peptide Systems Containing D-Amino Acids", Analytical Chemistry, 2021, pp. 2742-2748.
Phal, Y.; Yeh, K.; & Bhargava, R., "Vibrational Circular Dichroism Imaging", chemiamage.illinois.edu, Chemical Imaging and Structures Laboratory, 2021, 12 pgs.
Phal, Y.; Yeh, K.; & Bhargava, R., "Vibrational Circular Dichroism Measurements Using IR Microscopes: Opportunities & Challenges", chemimage.illinois.edu, Chemical Imaging and Structures Laboratory, 2021, 17 pgs.
Phal, Y.; Yeh, K.; Bhargava, R., "Polarimetric infrared spectroscopic imaging using quantum cascade lasers", Proceedings of SPIE, 2020, pp. 1125210-1-1125210-10.
Phal, Y.; Yeh, K.; Bhargava, R., "Vibrational Circular Dichroism Imaging", Poster presentation, 1 pg.
Phal, Y.; Yeh, K.; Bhargava, R., "Concurrent Vibrational Circular Dichroism Measurements with Infrared Spectroscopic Imaging", Analytical Chemistry, Jan. 26, 2021, vol. 93, No. 3, pp. 1294-1303.
Phal, Y.; Yeh, K.; Bhargava, R., "Design Considerations for Discrete Frequency Infrared Microscopy Systems", Applied Spectroscopy, 2021, vol. 75(9), pp. 1067-1092.
Phal, Y.; Yeh, K.; Bhargava, R., "Discrete Frequency Infrared Vibrational Circular Dichroism Spectroscopy & Imaging", Biophotonics Congress: Optics in the Life Sciences 2021, 2 pgs.
Phal, Y.; Yeh, K.; Bhargava, R., "Chirality mapping in microscopy format", 2 pgs.
Yeh, K.; Phal, Y.; Bhargava, R., "Infrared chemical imaging with scanning quantum cascade laser microscopy systems", Advanced Chemical Microscopy for Life Science and Translational Medicine, 116561A, Society of Photo-Optical Instrumentation Engineers (SPIE) Digital Library, Mar. 8, 2021 https://www.spiedigitallibrary.org/conference-proceedings-of-spie/11656/116561A/Infrared-chemical-imaging-with-scanning-quantum-cascade-laser-microscopy-systems/10.1117/12.2578981.short.

* cited by examiner

900

| |
|---|
| Generating, by a laser source, a pulsed beam, comprising a spectral frequency and a pulse repetition rate. |
| 910 |

↓

| |
|---|
| Modulating a polarization state of the pulsed laser beam to include right-hand circular (RHC) and left-hand circular(LHC) polarization states at a modulation frequency. |
| 920 |

↓

| |
|---|
| Transmitting, by a first group of optical components, the pulsed, modulated laser beam onto a location of a sample. |
| 930 |

↓

| |
|---|
| Collecting, by a first group of optical components, the pulsed, modulated laser beam emitting from the location of the sample onto a photodetector to produce a raw electrical signal. |
| 940 |

↓

| |
|---|
| Demodulating, by a first demodulator based on the pulse repetition rate, the raw electrical signal to obtain a first intensity value corresponding to the location of a sample. |
| 950 |

↓

| |
|---|
| Demodulating, by a second demodulator based on the sum/difference modulation frequency, the raw electrical signal to obtain as second intensity value corresponding to the location of a sample. |
| 960 |

↓

| |
|---|
| Determining, by a control device comprising a memory storing executable instructions and a processor, based on the first intensity value and a second intensity value a pixel value corresponding to the spectral frequency in a DFIR-VCD spectroscopic image corresponding to the location of the sample. |
| 950 |

FIG. 9

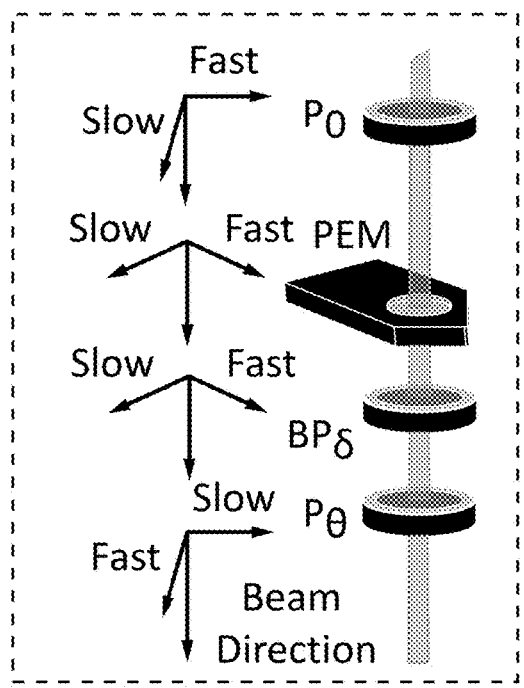
FIG. 11A
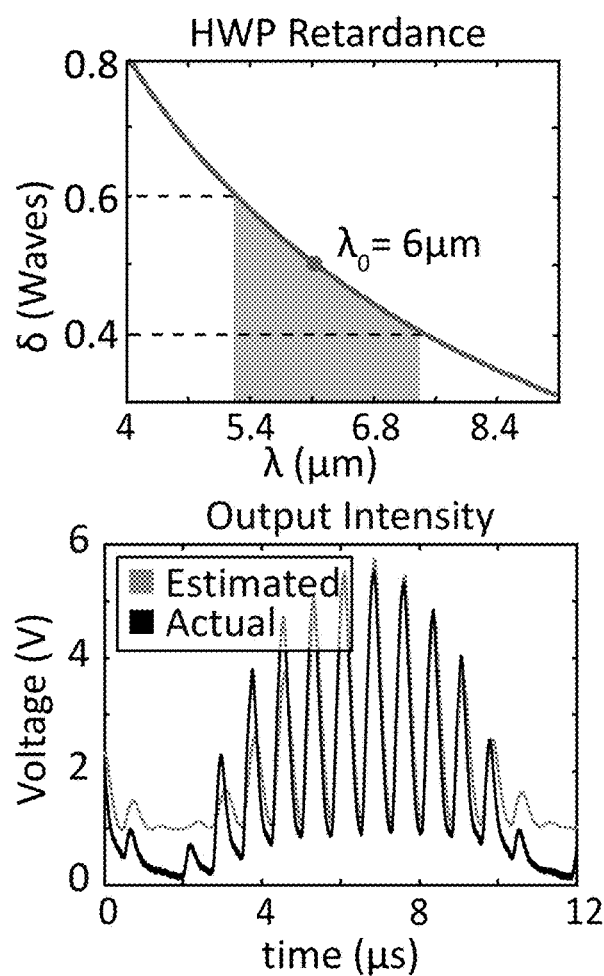
FIG. 11B
FIG. 11C

VIBRATIONAL CIRCULAR DICHROISM INFRARED SPECTROSCOPIC IMAGING MICROSCOPE

RELATED APPLICATION

This application claims the benefit of U.S. provisional application No. 63/052,785 having the same title, filed on Jul. 16, 2020, which is incorporated herein by reference in its entirety. This application is related to U.S. application Ser. No. 17/131,010, filed on Dec. 28, 2020, entitled METHOD AND APPARATUS FOR MULTI-COLOR DISCRETE FREQUENCY INFRARED SPECTROSCOPIC IMAGING.

GOVERNMENT LICENSE RIGHTS

This invention was made with government support under Grant No. R01 EB009745 awarded by the National Institutes of Health. The government has certain rights in the invention.

TECHNICAL FIELD

The present disclosure relates to methods and apparatus for infrared microscopy imaging, and more particularly to discrete frequency infrared spectroscopic imaging with light modulation capabilities for mapping/imaging of polarization-related absorption and dispersion in transflection and transmission modes.

BACKGROUND

Infrared (IR) spectroscopic imaging has undergone innovations in recent years that have advanced to be used as an analytical technique. IR spectroscopic imaging is a non-destructive approach that directly images the distribution of chemical composition of samples. Contrast is derived from molecular structures which absorb optical frequencies that are resonant with the vibrational modes of the comprised functional groups. Each peak in the absorption spectrum may correspond to a characteristic, which together can be used for the identification and classification of spatially-and spectrally-complex samples. While IR vibrational frequencies span the mid-IR spectral range (for example, a wavenumber range of 800-4000 $cm^{-1}$), the fingerprint region (for example, a wavenumber range of 800-1800 $cm^{-1}$) has traditionally been critical for biological and polymeric sample identifications.

Chirality is an extrinsic geometric property, wherein the molecule forms a non-superimposable mirror image with its enantiomer. Such chiral pairs, also known as stereoisomers, are typically characterized as either right-handed or left-handed depending on the molecular structure. Many biomolecules essential for life are chiral and, in many cases, only one of the stereoisomers is typically effective for specific biological processes while its non-superimposable complement is either inactive, or at times, highly toxic. Further, in addition to chirality arising from structural arrangements, chirality of a molecule can also be conformational. Understanding chirality of tissues or physical samples is an important aspect of the discipline of biomedical sciences as well as other scientific fields. The composition as well as structural and/or conformational chirality plays a dominant role in the efficacy and kinetics of the molecular interactions. Understanding biological processes, specifically related to drug metabolism and disposition, informs purification and testing aspects of drug development pipelines, where about 56% of pharmaceuticals currently on the market are chiral and about 88% comprised of equimolar racemic mixtures, including common drugs such as Ibuprofen, Propranolol, and Pindolol. Moreover, the approved drugs by FDA for the recent COVID-19 pandemic, such as Remdesivir and its various counterparts, are also chiral. While absorption of light in the mid-infrared (IR) spectral region provides information about the molecular composition of a sample, the differential absorption of left circularly polarized (LCP) and right circularly polarized (RCP) light provides a way of quantifying its chirality, at least empirically. Specifically, Vibrational Circular Dichroism (VCD) spectroscopy optically measures this difference in attenuation (i.e. circular dichroism, CD), providing an accurate and convenient method to estimate chirality.

Over the last two decades, the availability of Density functional theory (DFT) models and instrumentation to compute and evaluate VCD spectra has furthered our scientific and analytical understanding of this concept. However, the experiments have largely been of homogeneous samples. Most often, these samples are aqueous solutions with measurements conducted in transmission mode.

A VCD spectrometer is an infrared spectrometer that can measure the CD associated with infrared vibrational absorption bands, by measuring the differential absorption of left- and right-circularly polarized infrared light. The signals are relatively small compared with the corresponding IR signals. Anisotropy factors $\Delta A/A$ of $10^{-4}$ to $10^{-5}$ are typical, where A is the absorbance and $\Delta A$ is the difference in absorbance for left- and right-circularly polarized light.

The simplest of these instruments is the dispersive VCD spectrometer. Other techniques involving Fourier transform (FT) VCD spectrometers are more complex, but share the same underlying conceptual basis as the dispersive VCD spectrometer.

Originally built around dispersive spectrometers, current VCD instruments rely on interferometry and the throughput and multiplex characteristics of FT-IR spectrometers. However, due to the small optical signal obtained, the FT-IR technique typically requires relatively long acquisition time, typically ranging from 30 min to several hours or more, to collect sufficient co-averages and achieve a signal-to-noise ratio commensurate for analysis. In particular, quantitative estimates of fractional secondary structure content and site-specific information for biopolymers remains a significant challenge with FT-IR spectrometers for VCD analysis. The weak, broadband optical source is spatially distributed over a large area degrading the performance of multipixel detectors and imaging spectrometers show a reduction in signal to noise ratio (SNR) compared to non-imaging spectrometers. The limited sensitivity of FT-IR imaging and long acquisition times needed for VCD is a combination potentially impractical of acquiring reliable measurements.

Uncompensated chromatic distortions may compromise the accuracy and repeatability of results. Measurements are made over large band of contiguous wavelengths rather than at specific frequencies of morphological interest. Furthermore, the long acquisition time and focal volume per measurement makes it difficult to perform sufficiently high throughput spatially resolved mapping for the purpose of generating micro- and macroscopic images.

SUMMARY

We have implemented VCD analysis capability in a DFIR imaging spectrometer. The system we have described retains the imaging quality of an IR microscope and additionally provides a complementary capability for VCD measurements with utilizing a voltage-controlled waveplate such as a PEM in the design. The device may be augmented by a polarization analyzer and can also be used to simultaneously obtain linear dichroism (LD) and vibrational circular birefringence (VCB) measurements.

QCLs, which are described in more detail later, differ from traditional thermal FT-IR (Fourier-transform infra-red) sources in several aspects. QCLs are intrinsically linearly polarized, Other tunable laser sources such as vertical surface cavity lasers (VCSELs) or inter-band cascade lasers (ICLs) may be used. Rather than the weak, incoherent and diffuse radiance of an FT-IR globar source, coherent optical sources have far higher intensities with a beam that can be focused to a spot only microns wide, for example. With such a focused illumination volume, one can generate a stereoisomer-specific chemical map of a sample based on its polarization response. Such spectra have been acquired by the inventors for mid-size molecules, such as proteins, with a measurement time of under ~2 min, and in both solid and liquid forms and for human biological samples.

We disclose an apparatus for obtaining a discrete frequency infrared (DFIR) intensity data for a sample using polarized light. The intensity data may be used to obtain a spectrograph of a location on a sample over a wavelength range consistent with the tuning range of one or more lasers, or to obtain intensity data at a fixed wavelength for a plurality of locations on the sample so as to produce an image of a microscopic area of the sample. The apparatus includes a laser source configured to emit a laser beam having a spectral frequency and a pulse repetition rate; a first group of optical components configured to transmit the pulsed laser beam onto a location of a sample, including a photoelastic modulator (PEM) capable of introducing at retardance of least one-quarter of a wavelength of the beam emitted by the laser source; a second group of optical components configured to collect an optical signal transmitted, transflected or reflected from the location of the sample onto a photodetector to obtain an electric signal; a first demodulator configured to demodulate the electrical signal based on a the pulse repetition rate frequency, to obtain a first intensity value corresponding to the location of the sample; a second demodulator configured to demodulate the electrical signal, based on the modulation frequency to obtain a second intensity value corresponding to the same location of the sample; and a control device, including a processor and a non-volatile memory, configured to determine, based on the first intensity value and the second intensity value, a first pixel value and a second pixel value corresponding to the location of the sample.

In an aspect, the PEM is controlled so that the linearly polarized coherent light beam from the laser source has a right-hand circular (RHC) and a left-hand circular (LHC) polarization state per modulation cycle. In this case, the first intensity value may be interpreted as an absorption property of the matter at the location on the sample, and the second intensity value may be interpreted as a measure of the circular dichroism of the same location on the sample.

By using other polarization states, linear dichroism and circular birefringence may also be measured.

We also disclose a method for obtaining discrete frequency infrared (DFIR) intensity data for a sample for use in spectrograms, images or the like, the method comprising: generating, by a laser source, a laser beam comprising a spectral frequency and a first modulation frequency; modulating the polarization state of the laser beam to include at least two polarization states at a second modulation frequency; transmitting, by a first group of optical components, the modulated pulsed laser beam onto a location of a sample; collecting, by a second group of optical components, optical signal emitted from the location of the sample onto a photodetector to obtain an electric signal; demodulating, by a first demodulator, based on the first modulation frequency, the electric signal to obtain a first intensity value corresponding to the location of the sample; demodulating, by a second demodulator, based on at least the second modulation frequency, the electrical signal to obtain a second intensity value corresponding to the location of the sample; and determining, by a control device comprising a processor and a non-volatile memory, storing computer executable instructions in communication with the non-volatile memory, based on the first intensity value, a first pixel value of a DFIR spectroscopic image corresponding to the location of the sample; and based on at least the second intensity value, a second pixel value of a DFIR image corresponding to a same location of the sample.

The data obtained by the method is interpreted as summarized above and described in more detail in the sequel.

BRIEF DESCRIPTION OF THE DRAWINGS

The embodiments described herein may be better understood with reference to the following drawings. The components in the drawings are not necessarily to scale. In some drawings, components may be equivalently identified by alphanumeric designations as well as reference numerals.

FIG. 3B shows the orientation of the fast axes of the polarizer ($P_0$) and PEM and the resulting incident polarization with the combination;

FIG. 3C is a simplified schematic of the signal processing concept.

FIG. 9 is a representative flow chart of a method of obtaining a DFIR-VCD pixel value at a spectral frequency;

FIG. 11A shows the calibration setup using a combination of polarizers and/or a waveplate;

FIG. 11B shows the half-wave plate (center wavelength of 6 μm) retardance dependence on the incident IR wavelength and the compatible wavelength range.

FIG. 11C shows the acquired time series data and the estimated fit using a combination of polarizers;

DESCRIPTION

Figure 1:
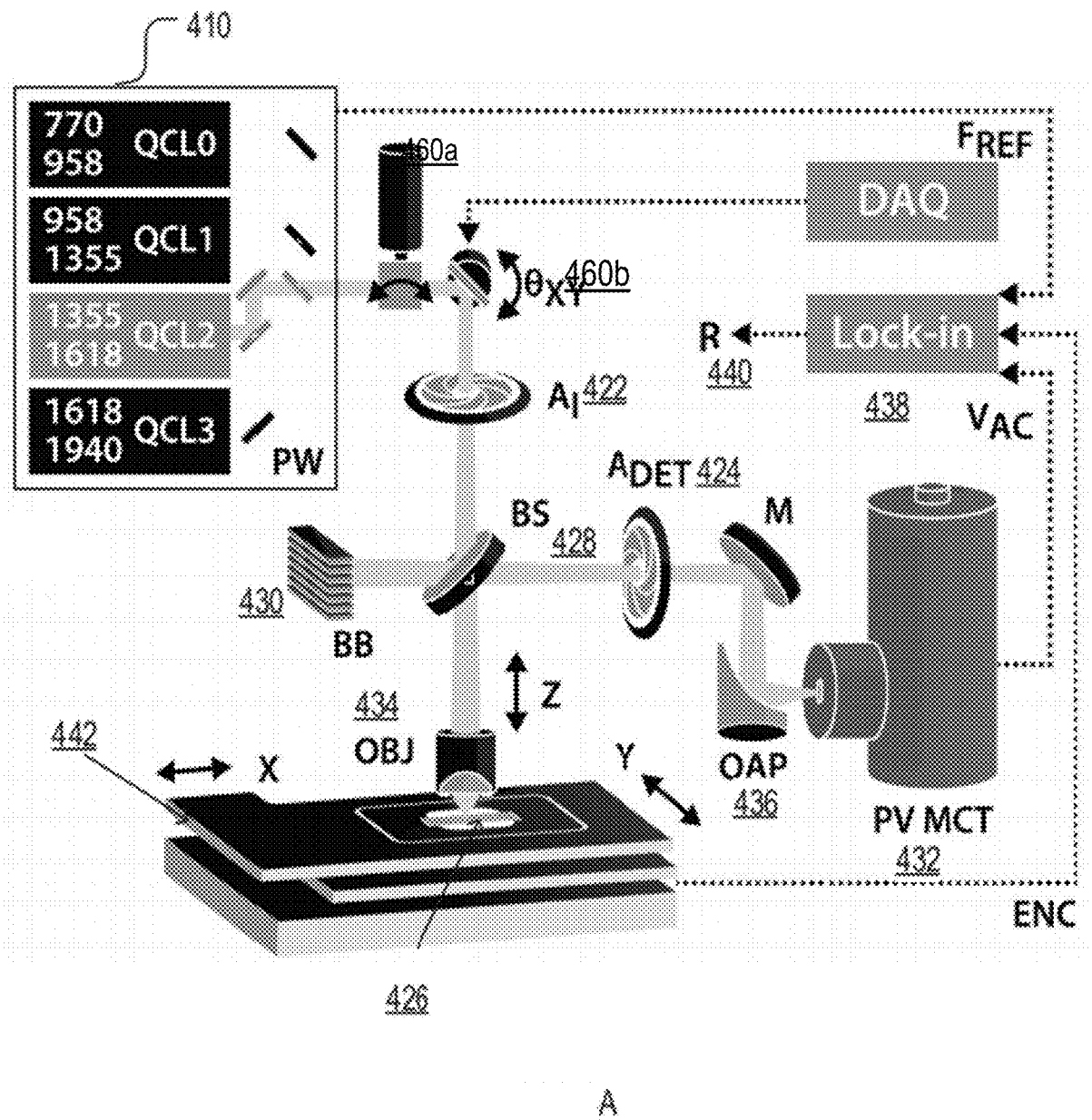
FIG. 1 shows a schematic representation of an QCL microscope for performing multi-color DFIR spectroscopic imaging.

The disclosed systems and methods will now be described in detail hereinafter with reference to the accompanied drawings, which form a part of the present application, and which show, by way of illustration, examples of embodiments. Please note that the systems and methods may, however, be embodied in a variety of different forms and, therefore, the claimed subject matter is intended to be construed as not being limited to any of the embodiments to be set forth below. The disclosed concepts may be embodied as methods, devices, components, or systems. Accordingly, embodiments of the disclosed system and methods may, for example, take the form of optical and electronic hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter may include combinations of exemplary embodiments in whole or in part. Moreover, the phrase "in one implementation", "in another implementation", or "in some implementations" as used herein does not necessarily refer to the same implementation or different implementation. It is intended, for example, that claimed subject matter may include combinations of the disclosed features from the implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Infrared (IR) vibrational frequencies of materials may for example span the mid-IR spectral range (for example, in a wavenumber range of 800-4000 cm$^{-1}$). Within the mid-IR spectral range, a fingerprint region (for example, in a wavenumber range of 800-1800 cm$^{-1}$, equivalent to a wavelength range of 12.8 to 5.4 μm) may be useful for biological and/or polymeric sample identifications. Other applications of the device and technique may use different spectral ranges and data acquisition parameters and are not limited to: the ultraviolet (UV) or visible wavelengths of light, as would be used in measuring the circular dichroism (CD) or electronic circular dichroism (ECD). The laser sources, detectors and other optical elements can be chosen such that the spectral parameters are appropriate for the desired measurements.

The acquisition of data over a limited spectral range reduces data acquisition time while maintaining the analytical capabilities of IR spectroscopy and imaging. The ability to obtain actionable information about a sample may not require the measurement of the continuous spectral range, which is a significant existing restriction that is an intrinsic property of Fourier Transform (FT) technology, the historical state-of-the-art.

The present disclosure describes embodiments for discrete frequency infrared microscopy (DFIR) systems using a set of spectral positions, or spectral interval scans, adapted to obtain data related to polarization-dependent absorption or dispersion characteristics of materials, including biologic samples. Embodiments include a plurality of discrete laser wavelengths, spectral scans using tunable lasers for imaging discrete locations, and images obtained by scanning the location of the sample with respect to the light source using mechanical means such as stages or beam turning mirrors actuated by, for example resonant scanners, galvanometer-based motors (also referred to as galvos), rotating prisms polygon scanners, piezoelectric oscillators. Polarization of the optical signal is modulated and the effect (absorption and or dispersion) on the detected signal determined. The technique is not limited to vibrational circular dichroism measurements, but can be adapted to measure to linear dichroism, linear birefringence and circular birefringence through minor changes in the optical design such as addition of polarizers or waveplates. A complete Mueller matrix description of the sample can be formulated from this extension. The concepts disclosed are not limited to instruments that directly measure residual infrared light to infer absorption. The technique can be adapted to instruments that indirectly measure absorbed infrared light by means of hybrid modalities, for instance, by measuring the photoinduced or thermal expansion effect via not only optical probe beams but also via mechanical and acoustic means.

A discrete subset of spectral positions may be sufficient, for example, for histopathological tissue imaging. The DFIR system may use quantum cascade lasers (QCL) with 50-fold gains in data acquisition speed by only measuring the spectral frequencies required. Furthermore, with the substantially higher source power and a narrower spectral range of lasers, refractive optics may be used for better image formation. Using the QCL laser as an example of a coherent light source, we describe a modification to a DFIR microscope device to extend the capability to include performing measurements of vibrational circular dichroism (VCD).

A DFIR QCL microscope shown in FIG. 1 is a non-limiting example, previously disclosed by two of the inventors named in this application, of an apparatus, system and method for performing DFIR spectroscopic imaging. The system may use one or more QCL laser modules 410 that together have a tuning range that spans, for example, some or all of the mid-IR region (e.g., a particular mid-IR fingerprint region). In other examples, lasers at discrete frequencies, or tuned by other techniques may be used as the optical source.

Dual apertures ($A_I$ 422 and $A_{DET}$ 424) equidistant from the sample 426 on the illumination and detection paths are aligned such that they have identical focal points in the sample plane and serve to limit spurious reflections. Half of the illumination beam is split with a beam splitter (BS 428) and directed towards to the sample and half blocked by a beam block (BB, 430). One of the resultant illumination beams is focused onto a location of the sample using a refractive lens, for example objective lens (OBJ, 434). Residual unabsorbed light passing through the illuminated location of the sample is transflected and directed by the beam splitter (BS, 428) on to the detector 432 by a reflective off-axis parabolic mirror (OAP, 436). Equivalently, a focusing lens may be used in lieu of the parabolic mirror (OAP, 436). Alternative forms of focusing optics, not limited to off-axis parabolic mirrors, may include reflective, or refractive, or hybrid systems; each with surfaces incorporating at least one of: on or off axis parabolic; spherical or aspherical surfaces; non-rotationally symmetric toroidal or cylindrical designs; or freeform geometries. The microscope may permit epi-illumination of the sample with an interchangeable selection of objectives, for instance with numeric apertures (NA) of 0.56, 0.71, and 0.85, which may span the upper range of NAs in most IR imaging studies.

The transflected signal may be detected, for example, by a cryogenic photovoltaic mercury cadmium telluride (PV MCT) detector 432, with or without pre-amplification or biasing and demodulated using a lock-in amplifier (LIA) 438 referenced to the specific QCL's pulse repetition frequency. The magnitude (R, 440) of the in-phase and quadrature signal components may be used to form an image using the processed detected data as the stage 442 scans a plurality of locations of a sample 426. A conventional white-light epi-illuminated inverted microscope (not illustrated) may be built underneath the microscopy stage and may be used for targeting selecting the area for IR scanning.

The instrument may be designed to scan locations of the sample line-by-line. The instrument scans row-by-row, for example but not limited to, horizontally or vertically. Since the stage coordinates are adjusted to align to the sample plane, an affine transformation matrix is possible, including rotations that scan diagonally. Scan areas may be rectangles, but may not be limited to be rectangles. This framework may improve efficiency by fitting the scan pattern to the arbitrary sample, thereby minimizing the amount of empty space that is wastefully mapped point-by-point. Scan trajectories may be free-form and defined in real-time to best suit the estimated morphology of the sample.

An important performance metric in design of any measurement instrument may be the signal-to-noise ratio (SNR). The analytical signal (in this case, the absorbance) is determined by the properties of the location of sample in IR spectroscopy and noise is the metric for comparison. Two sources of noise may be examined in imaging. The first is the variation across the field of view, while the second is the spectral noise at any point. The spatial noise may include a component arising from spectral noise (at every pixel) and variations in the image (arising from illumination, focusing, drift or other sources). In addition, each system may have unique spatial noise contributions.

Noise control for the DFIR microscope may be determined by adjusting scan speeds to affect pixel dwell times, while the lock-in time constant and filter orders are set such that their settling time resides within the minimum dwell time of any pixel. Consequently, for each pixel, the number of laser pulses recorded may be the same, regardless of dwell time at any specific position with respect to the range of stage motion. These controls may ensure that the SNR achieved is both maximized and consistent across the image. Optionally, if the stage velocity is decreased, pixel dwell times may increase causing the system to select longer filter time constants thereby improving SNR further without needing repeated co-averaged scans.

The advantages of QCL (and other coherent laser source) systems may become significant in measurements with resolutions under ~60 μm as a coherent source may be condensed to a much smaller focal point with enough power remaining to effectively illuminate a detector. In contrast, the minimum focal spot achievable with an incoherent thermal source depends on the magnification of the system and the size of the source, which is comparatively large. Further windowing is necessary to restrict the measurement area which also restricts the available light and consequently degrades the SNR. In currently reported experimental results, for it may be concluded that the performance of an FT-IR imaging system for a full spectrum at a given pixel has been surpassed by a DFIR when small areas (smaller than 50 μm×50 μm) are measured per pixel. While the spectral range of QCLs cannot yet cover the full range of FT-IR instruments, laser innovations are continuing to bridge the gap and their use as they become available would be understood by persons of skill in the art.

Figure 2:
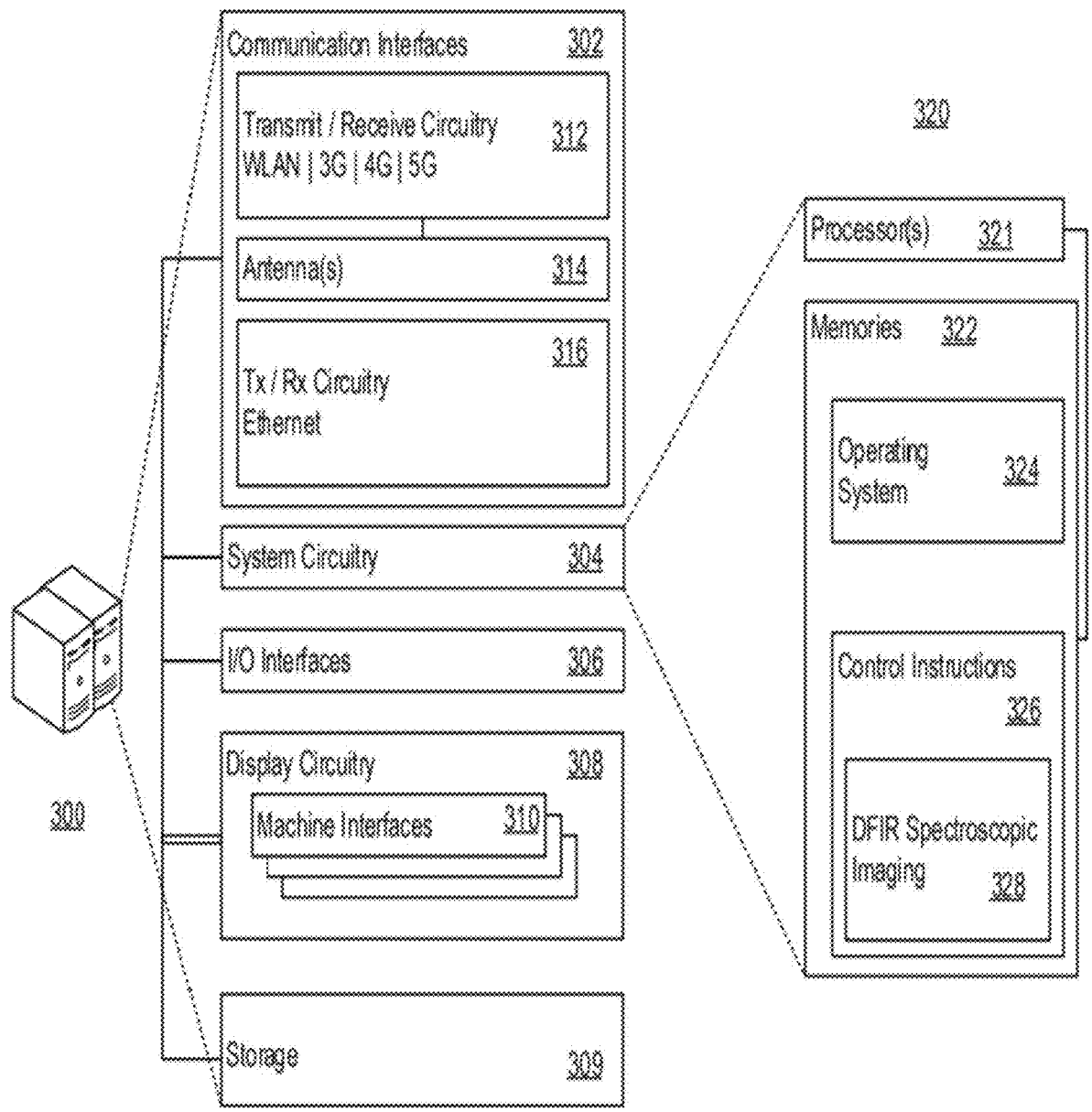
FIG. 2 shows an example of an electronic device that may be used to implement the control device for the DFIR QCL-VCD device of FIGS. 3A-C and 4.

FIG. 2 shows a control device for the DFIR devices of FIGS. 1, 3A-3C, and 5, comprising a computer system 300, controlling the apparatus for performing DFIR spectroscopic imaging. The computer system 300 may include communication interfaces 302, system circuitry 304, input/output (I/O) interfaces 306, digital storage 309, and display circuitry 308 that generates machine interfaces 310 locally or for remote display, e.g., in a web browser running on a local or remote machine. The machine interfaces 310 and the I/O interfaces 306 may include graphical user interfaces (GUI) touch sensitive displays, voice inputs, buttons, switches, speakers and other user interface elements. Additional examples of the I/O interfaces 306 include microphones, video and still image cameras, headset and microphone input/output jacks, Universal Serial Bus (USB) connectors, memory card slots, and other types of inputs. The I/O interfaces 306 may further include keyboard and mouse interfaces.

The processor 321 may execute a computer program comprising machine readable instructions 326 stored in non-volatile portion of the memory 322, or the instructions may be loaded from internal or external non-volatile memory to a volatile memory where it may reside while the computer system is operating. The non-volatile memory may include memory that may be detached from the computer system 300. The memories 322 may store, for example, control instructions 326 and an operating system 324. The control instructions 326, for example may include instructions for performing DFIR spectroscopic imaging 328. The instruction processors 321 may execute the control instructions 326 and the operating system 324 to carry out the functionality related to performing DFIR spectroscopic imaging.

The communication interfaces 302 may include wireless transmitters and receivers ("transceivers") 312 and any antennas 314 used by the transmitting and receiving circuitry of the transceivers 312. The transceivers 312 and antennas 314 may support Wi-Fi network communications, for instance, under any version of IEEE 802.11, e.g., 802.11n or 802.11ac or a functional equivalent thereof. The transceivers 312 and antennas 314 may support mobile network communications, for example, 3G, 4G, and 5G cellular radio communications. The communication interfaces 302 may also include wireline transceivers 316, for example, Ethernet communications. The communication interfaces 302 described herein are intended to be exemplary and in no way intended to limit the technology used for external or internal electrical interfaces.

The digital storage 309 may be used to store various initial, intermediate, or final data or model for performing spectroscopic imaging, as well as various look-up tables and computational algorithms for managing the operation of the device. These data corpus may alternatively be stored in an external database. The storage 309 may be centralized or distributed and may be local or remote to the computer system 300. For one example, a data server may be located in the same room or building and connect to the computer system 300 via a wireless or a wire communication. For another example, the storage 309 may be hosted remotely by a cloud computing service provider.

The system circuitry 304 may include hardware, software, firmware, or other circuitry in any combination. The system circuitry 304 may be implemented, for example, with one or more systems on a chip (SoC), field-programmable gate arrays (FPGAs), application specific integrated circuits (ASICs), microprocessors, discrete analog and digital circuits, analog-to-digital converters (ADCs) and digital-to-analog converters (DACs), and other circuitry, executing instructions of firmware and software which may be stored on non-volatile storage and executable by the computing devices.

In an example of the operation of a DFIR microscope such as shown in FIG. 1, an optical signal emitted from a coherent laser source may produce a beam that is imaged onto a spot located on a sample and the transflected light from the illuminated spot is directed onto an optical detector. An electrical signal output from the detector is demodulated by a coherent detector such as a lock-in amplifier (LIA), a resonant scanner or an equivalent digital or analog circuit or performed in the computer. The optical signal from the laser source may be modulated or pulsed either by an internal or external means, as is known in the art. The LIA demodulates this signal based on a pulse or modulation frequency. The demodulated signal may comprise a pixel value of an image at a particular location and wavenumber and may be stored in the storage memory of the computer. Additional pixel values may be obtained using a programmed data collection protocol that may be configured to collect pixel data so as to form an image of an area on the sample.

Herein, "pulsed" may refer to a periodic variation of intensity or phase, and "pulsed laser beam" may refer to any laser not classified as continuous wave, so that the optical power appears in pulses of some duration at some repetition rate. It may arise by, for example but not limited to, intensity, phase or spatial light modulation or any combinations thereof of a continuous wave laser, Q-switching, mode-locking, and/or pulsed pumping. In one implementation, the mid-IR region may include a wavelength range from 2 μm to 20 μm. In another implementation, the mid-IR region may refer to a molecular-fingerprint region, i.e, a mid-IR fingerprint region (for example, a wavenumber range of 800-1800 $cm^{-1}$), in which most molecules have intense fundamental vibrational bands.

For example, the laser source may refer to a single laser module have a spectral tuning range within the mid-IR fingerprint region; alternatively, more than one laser module that together have a tuning range that spans all or part of the mid-IR fingerprint region; a quantum cascade laser (QCL); an optical parametric oscillator (OPO); or an optical parametric generator (OPG) or vertical-cavity surface-emitting lasers (VCSELs) and fiber lasers. In another implementation, an inter-band cascade laser (ICL) or a quantum cascade multi-laser source that contains several individual tuner modules with beams combined into a single collinear output spanning the mid-IR fingerprint region. A person of skill in the art will understand that the intent is to specify a source of coherent optical energy of suitable power at one or more wavelengths, and which may be modulated in phase or amplitude rather than limiting the source by characterizing the specific physical mechanism for generating such optical power as such devices are continually being developed. For simplicity presentation, the coherent laser beam may be presumed to be purely linearly polarized. To the extent that this is not the case, a polarizer may be inserted after the laser output to suppress the spurious signals.

The optical path may have, for example a selection of beam steering mirrors, for example, actuated by resonant scanners, galvanometer-based motors (also referred to as galvos), rotating prisms or polygon scanners, piezoelectric oscillators, to assist the alignment of the pulsed laser beam or to be used to scan the beam over an area of the sample, which may have been selected by adjusting a mechanical stage. The optical path can also be directed by the scanning system to sweep the beam over the sample using custom-designed optics.

The optical path may include a reflective off-axis parabolic mirror, mirrors or lenses to focus the collected first optical signal on a photonic detector. The detector may depend on one or more of different physical methods of converting (detecting) the incident optical power to an electrical signal. An example includes directly using the residual intensity of the optical beam, e.g, thermal detectors and/or photonic detectors. Other indirect methods may include secondary optical probe beam, an acoustic probe, and/or a mechanical probe; or, the detector may include at least one of the following: photovoltaic technology based sensors: a mercury cadmium telluride (MCT) detector, Schottky barriers detector (SBD) on silicon, platinum silicide (PtSi), or gallium indium antimonide (GaInSb) strain layer superlattices (SLS); photoconductive technology and designs consisting of: SiGe heterojunctions, impurity band conduction (IBC detector) and solid-state photomultiplier, and multiple quantum wells infrared photodetector (QWIP); an uncooled bolometer; or a visible light detector in conjunction with a visible laser. Optionally, the detector (for example but not limited to, a photonic detector) may be cooled by at least one method of a thermoelectric cooling (TEC) or a cryogenic cooling to decrease noise so as to improve the SNR. In another implementation, this may be an uncooled detector.

A DFIR spectroscopic image may comprise an array of pixels. Each pixel may include a pixel value representing the received intensity value for a specific spectral frequency and location on the sample. A specific spectral frequency may be referred as a spectral band. The control device determines a pixel value for a spectral band (corresponding to the spectral frequency of the pulsed laser beam) for a pixel in the DFIR spectroscopic image corresponding to the first location on the sample. Each pixel in the DFIR spectroscopic image may include more than one-pixel value corresponding to more than one specific spectral frequency or measured characteristic.

To determine more pixel values for other pixels in the DFIR spectroscopic image, the method may include changing locations on the sample illuminated by the focused laser beam. In one implementation, the sample may be placed on a movable stage, and the movable stage may communicate with the control device to receive instructions to move in two-dimensional (x and y) or three-dimensional (x, y, and z) axes. The movable stage holding the sample may sweep the sample relative to the laser beam to other locations on the sample. In another implementation, a first group of optical components may include at least one rotatable mirror. At least one rotatable mirror may communicate with the control device to receive instructions to rotate so as to steer/scan the first pulsed laser beam to other locations on the sample.

The noise in the absorbance measurements acquired by the apparatus disclosed here is approximately one order of magnitude lower than a FT-system. Since VCD measurements are scaled by the absorbance measurements, the QCL-VCD spectra theoretically have lower noise compared to FT-VCD spectra when normalized for similar experimental conditions.

The advantages of QCL (and other coherent laser source) systems over FT-systems may become significant in measurements with resolutions under ~60 μm because a coherent source may be condensed to a much smaller focal point with enough power remaining to effectively illuminate a detector. The minimum focal spot achievable with an incoherent thermal source depends on the magnification of the system and the size of the source, which is comparatively large.

The DFIR-VCD technique disclosed herein uses a discrete frequency, polarized, high intensity source, and a variable waveplate, such as a photoelastic modulator (PEM.) Some of the drawbacks inherent in using PEMs for FT-IR imaging or a thermal source-based dispersive instrument for VCD can be avoided. For, example, the retardance (modulation voltage) of the PEM in the DFIR-VCD can be changed in at the measurement frequencies using a calibration table, eliminating the need for additional filters, reducing the need for calibrations or corrections. In an example of the DFIR-VCD microscope described herein we use a digitally tunable PEM 200 IIZS50 (Hinds Instruments, Hillsboro, Oreg.). Other wavelength-dependent adjustments such as focusing corrections may also be performed in a controlled and repeatable way.

We now disclose modifications to the apparatus shown in FIG. 1 to extend the measuring capability so as to obtain a measure of the polarization characteristics of the pixel being illuminated as well as to extend the function of the DFIR microscope to collect pixel data in both the transflection and transmission modes to recover a diagnostic signal related to the polarization-dependent absorption characteristics (LD or VCD) or dispersion characteristics (VCB) of materials, such as molecules exhibiting chirality.

Figure 3A:
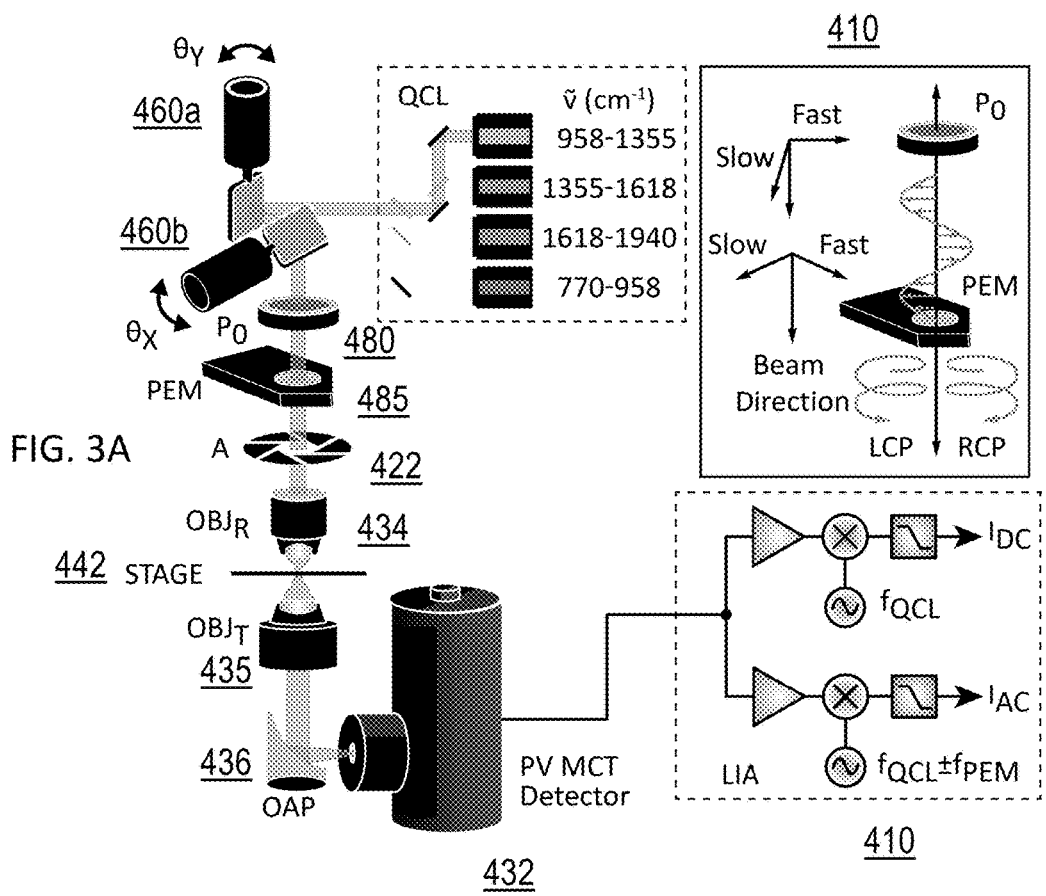
FIG. 3A shows a schematic representation of a DFIR QCL-VCD with PEM polarization control and lock-in amplifier detection at multiple demodulation frequencies in a transmission configuration.
Figure 4:
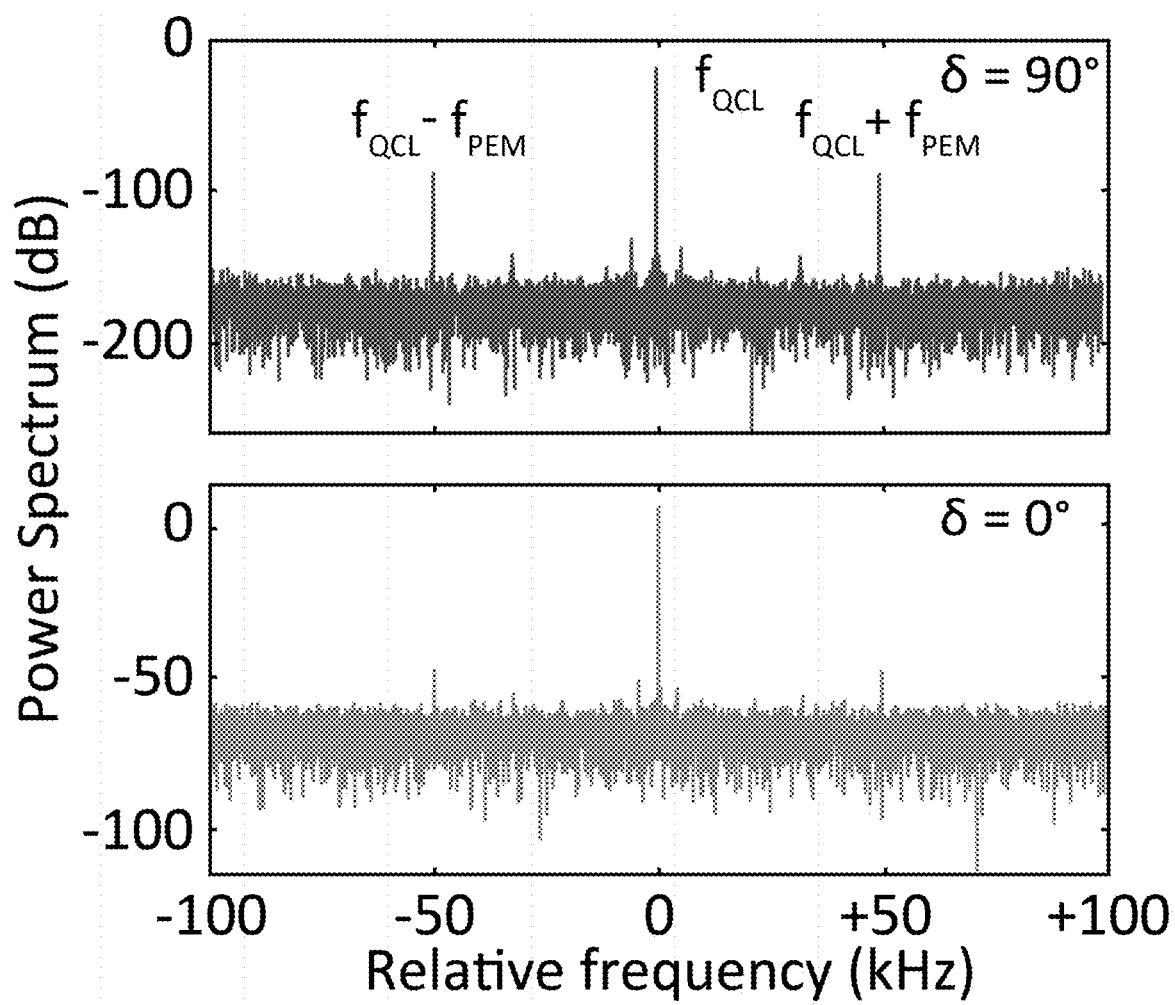
FIG. 4 shows a schematic representation of a DFIR QCL-VCD with PEM polarization control and lock-in detection at multiple demodulation frequencies in a transmission and a transflection configuration.

A generalized layout of a DFIR QCL-VCD microscope is shown in FIG. 3A, having the capability for spectroscopic imaging of samples in a transmission configuration. The design builds upon the previously described stage-scanning microscope design that enables fast, point-by-point, high-definition image data acquisition by adding the capability to measure vibrational circular dichroism (VCD).

A continuously tunable QCL source (LaserTune, Block Engineering, Southborough, Mass.) with 4 multiplexed tuners that combine to emit a coherent IR beam tunable between 770 to 1940 cm$^{-1}$, with a spectral linewidth of 2 cm$^{-1}$, and that may be pulsed up to 2 MHz with a 6% duty cycle. Beam pointing with respect to the target location may be controlled by a pair of galvanometer mirrors (6251H, Cambridge Technology, Bedford, Mass.) that can be controlled to stabilize the pointing direction of laser beam. Alternatively, a mechanical stage can be used, either in conjunction with or in place of the galvanometer mirrors.

A polarizer ($P_0$, 480) may be used to further ensure a consistently linearly polarized optical beam, even though the laser output may be linearly polarized. In order to generate polarizations varying from RCP to LCP, (see FIG. 3B) a linearly polarized beam is oriented at 45° to the axis of a phase retarding device (PEM, 485). The output of the PEM varies in polarization in response to the variation of the phase shift induced in the linearly polarized beam by the PEM, and the control voltage is adjusted so that RCP and LCP polarization states are alternately achieved at the operating wavenumber of the laser source. The modulation frequency is different than that of the laser. The PEM modulates the polarization of the transmitted optical beam based on the photoelastic effect, where a voltage-controlled mechanical stress induces birefringence in crystals that is proportional to the resulting strain. The PEM fast optical axis is set to 45° with respect to the linearly-polarized direction of the incident IR beam and the maximum retardance is set corresponding the laser beam wavelength. At the peak retardance of the PEM ($\lambda_0/4$), the result is a modulation between the LCP and RCP light states that oscillates sinusoidally at the PEM resonant frequency (e.g, 50 kHz).

The retardance (modulation voltage) of the PEM in the DFIR-VCD can be changed at the at the various measurement spectral frequencies using a calibration table, eliminating the need for additional filters, reducing the need for calibrations or corrections. Other wavelength-dependent adjustments such as focusing corrections may also be performed in a controlled and repeatable way.

The beam emitted from the PEM may be focused, for example, using a chalcogenide glass (BD-2, $Ge_{28}Sb_{12}Se_{60}$) 0.71 numeric aperture (NA) refractive lens (OBJR) (#88-082, Edmund Optics, Barrington, N.J.) onto the sample. Out-of-focus scattered light is rejected by apertures (A, 425) placed on the source and detection sides of the sample. The optical signal transmitted through the sample mounted on the stage 442 is focused onto the detector by, for example, a ZnSe broadband light optic ($OBJ_T$) with 0.71 NA and 12.7 mm EFL and directed onto a cryogenic photovoltaic mercury cadmium telluride (PV MCT) detector (MCT-13-0.5PV, InfraRed Associates, Stuart, Fla.) using a 50.7 mm EFL reflective off-axis parabolic (OAP) mirror or other focusing optics.

As previously described, other detector types may be used and the OAP may be replaced by any focusing optics such as and not limited to refractive focusing lenses, spherical and toroidal reflective optics, parabolic on-axis reflective optics. The IR absorption spectrum is isolated by demodulating the signal at the laser modulation signal frequency using a lock-in amplifier (LIA) (MFLI, with F5M & MD, Zurich Instruments, Zurich, CH) whose function is shown schematically in FIG. 3C where $f_{QCL}$ is the laser pulse frequency and $f_{PEM}$ is the polarization modulation frequency. This QCL-VCD microscope setup acquires simultaneous IR and VCD images or spectra by using a device for modulating polarization, including but not limited to a photoelastic modulator (PEM). The VCD spectrum is obtained by simultaneously demodulating the optical signal at the laser pulse rate and PEM modulation difference or sum frequency.

The PEM was configured as a broadband optical phase retarder or a variable waveplate and may be constructed, for example using single or multiple piezoelectric transducers. The PEM used in embodiment may have a birefringent crystal as the transducer that is made of, for example, zinc selenide (ZnSe), fused quartz, calcium fluoride, and KRS-5. Any non-cubic crystals and plastics under mechanical stress that exhibit induced birefringence may be used. PEM uses photoelastic effect to generate polarization modulation such that a mechanically stressed crystal exhibits anisotropy in the refractive index along the orthogonal axes to generate retardance or a phase delay between the two perpendicular vectors of the electromagnetic wave. The crystal thickness can also be varied to generate retardance, for instance in Berek tunable waveplates. When the equivalent phase delay is 90°, this results in a circularly polarized wave. The modulation frequency is determined by the resonant characteristics of the material and the device assembly. The retardance depends on the strain, which is a function of the applied voltage. Alternative polarization modulators that are based on acousto-optic effects or electro-optic effects, including but not limited to Pockels cell or can also be used in place of the PEM. PEMs based on engineered materials such as 2D heterostructures, polarization-controlled metamaterials, metasurfaces or plasmonic structures can also be used.

The PEM fast optical axis is set to 45° with respect to the polarization direction of the incident linearly-polarized IR beam and the maximum retardance of the PEM may be set corresponding to a design wavelength ($\lambda_0$), which is same as the QCL output beam wavelength. The modulation voltage of the PEM ($\lambda_0/4$), may be controlled such that the polarization state oscillates between LCP and RCP light states at the PEM's resonant frequency (50 kHz, in this example). Typically, in a DFIR-VCD microscope, the differential response between the LCP and RCP is measured. To mitigate undesirable interference effects and reflections, and eliminate any stray light occurring at an undesired peak retardation, the PEM may be slightly tilted with respect to the optical beam while keeping a 45° alignment between the fast optical axis and the direction of polarization. Additionally, anti-reflection coatings may facilitate improved performance.

The generation of rapidly switching states of circularly polarized light in any VCD spectrometers (FT- or QCL-based) is enabled by PEM operation. By their implicit nature, however, waveplates, including PEMs, exhibit chromatic behavior and are typically optimized at discrete spectral frequencies. The differential transmission of the beam centered at a fixed frequency in a PEM crystal, limits the PEM broadband operation (FT systems) since the fast axis orientation slightly varies with wavenumber. The absolute magnitude of this modulator chromatic variation over the entire operating wavenumber range may vary between 10% to 20% of the nominal value, which can affect the generation of the circular polarization beam. This characteristic presents a problem for FT-IR spectrometers, where all wavenumbers are transmitted simultaneously, in only being effective over a limited bandwidth and not providing an equally high quality of polarization at all wavenumbers. Unlike fixed waveplates, PEMs are variable retarders such that the phase retardance is actively controlled by applying a specific voltage. Hence, unlike FT-systems, DFIR-VCD systems can be effectively tuned to incorporate a PEM such that the operation is essentially achromatic. PEMs are optimized at discrete spectral frequencies by the user and this can be changed dynamically a capability which is unique to DFIR systems with this configuration.

Since the efficiency of the PEM with a fixed modulation voltage is not consistent through the entire spectral frequency range, ideally, filters may be necessary to restrict the transmitted range when using a spectrally broadband source and reduce both the throughput per se as well as the FT-multiplex advantage. The combination of reduced efficiency and light throughput caused by filters are severe disadvantages and so far, have limited the use of FT-IR VCD spectroscopy in microscopic sample characterization. The present apparatus overcomes this problem.

A brief statement of the theoretical basis for the operation of the DFIR-VCD spectrometer will aid in understanding the design and operation of the device. A FT-IR VCD spectrometer in standard transmission configuration uses an incoherent continuous source. However, VCD systems using coherent pulsed light sources, as described here, are not well understood and nor is the mathematical derivation explicitly formulated. We provide a mathematical framework for a QCL-VCD system in either transflection or transmission configurations, using a coherent pulsed light source. The Stokes-Mueller formalism is a classic way of characterizing an optical system by the mathematical representation of the response of each element in the optical train to excitation by polarized light. The polarization state of an optical beam is mathematically described as, $$S = \begin{Bmatrix} I \\ Q \\ U \\ V \end{Bmatrix} = \begin{Bmatrix} I_T \\ I_{0°} - I_{90°} \\ I_{45°} - I_{135°} \\ I_R - I_L \end{Bmatrix} \quad (1)$$

where, I is the total intensity and sum of all the orthogonal polarizations, Q and U are the differences in the linear polarization components and V is the net circular polarization component (RCP−LCP). The linear interaction of an optical device with a beam of light can be described as a transformation of an incident Stokes vector $S_i$ into an emerging Stokes vector, $S_o = MS_i$, where M is the Mueller matrix that is a characteristic of the optical device or system. Without any instrumental polarization, the matrix, M equals the identity matrix and $S_o = S_i$. The transformation of an initial Stokes vector by a sequence of optical devices is given by the consecutive product of the matrices representing each element, including the rotation matrices due to the angles between their planes of incidence. The Mueller matrix representations for the various optical elements used in the setup are approximately described in eq Error! Reference source not found, where any non-linear effects, including the polarization change due to the lenses are neglected. $S_0(f_{QCL}, \tilde{v})$ is the Stokes vector for the input QCL source beam, with pulse repetition rate $f_{QCL}$, peak intensity $I_0(\tilde{v})$ at wavenumber $\tilde{v}$. The individual Mueller matrices for the system can be represented sequentially with the sample, $M_X(\tilde{v})$, a PEM, $M_{PEM}(f_{PEM}, \tilde{v})$, a polarizer, $M_P(\tilde{v})$, and a detector, $M_D(\tilde{v})$. The overall intensity is diminished by the absorbance factor of $10^{-A''(\tilde{v})}$. The total intensity recorded by the detector after passing through a train of optical elements can be expressed as, $$I_T(\tilde{v}) = M_D M_X(\tilde{v}) M_{PEM}(45°, \alpha_M(\tilde{v})) M_P(0°) S_0(f_{QCL}, \tilde{v}) = \quad (2)$$

$$\frac{I_0(\tilde{v})}{4} 10^{-A''(\tilde{v})}(1 + 2J_1[\alpha_M^0(\tilde{v})]CD(\tilde{v}) + J_0[\alpha_M^0(\tilde{v})]),$$

where $J_0[\alpha_M^0(\tilde{v})]$ and $J_1[\alpha_M^0(\tilde{v})]$, are the zero and first order Bessel functions that are a function of the wavenumber and the peak PEM retardance angle specified by $\alpha_M^0(\tilde{v})$. Note that the PEM retardance angle varies sinusoidally as, $\alpha_M(\tilde{v}) = \alpha_M^0(\tilde{v})\sin(2\pi f_{PEM} t)$. $J_1[a_M^0(\tilde{v})]$ is associated with the transformation of the linearly polarized light into circular polarization resulting in the first harmonic signal component. $J_0[\alpha_M^0(\tilde{v})]$ contributes to the fundamental signal component and PEM phase is chosen such that $J_0[\alpha_M^0(\tilde{v})]=0$. The standard transmission theory formulation can be specified by eq Error! Reference source not found, where the acquired signal comprises of two dominant components, namely $I_{DC}(\tilde{v})$ and $I_{AC}(\tilde{v})$:

$$I_T(\tilde{v}) = I_{DC}(f_{QCL}, \tilde{v}) + I_{AC}(f_{QCL} \pm f_{PEM}, \tilde{v}).$$

By using the following derivation for the CD intensity, $$CD = \frac{1}{2}\ln(10)[A_L(\tilde{v}) - A_R(\tilde{v})] = 1.1513\Delta\lambda_{VCD}(\tilde{v}), \quad (4)$$

with the ratio of the AC and DC terms, $$\frac{I_{AC}(\tilde{v})}{I_{DC}(\tilde{v})} = J_1[\alpha_M^0(\tilde{v})][1.1513\Delta A_{VCD}(\tilde{v})], \quad (5)$$

we can isolate the VCD spectrum ($\Delta A_{VCD}(\tilde{v})$) as follows, $$\Delta A_{VCD}(\tilde{v}) = \frac{1}{1.1513 J_1[\alpha_M^0(\tilde{v})]}\left[\frac{I_{AC}(\tilde{v})}{I_{DC}^0(\tilde{v})}\right]. \quad (6)$$

In addition, measurement of IR absorbance ($A_{IR}(\tilde{v})$) is provided by, $$A_{IR}(\tilde{v}) = -\log_{10}\left(\frac{I_{DC}(\tilde{v})}{I_{DC}^0(\tilde{v})}\right). \quad (7)$$

Figure 5:
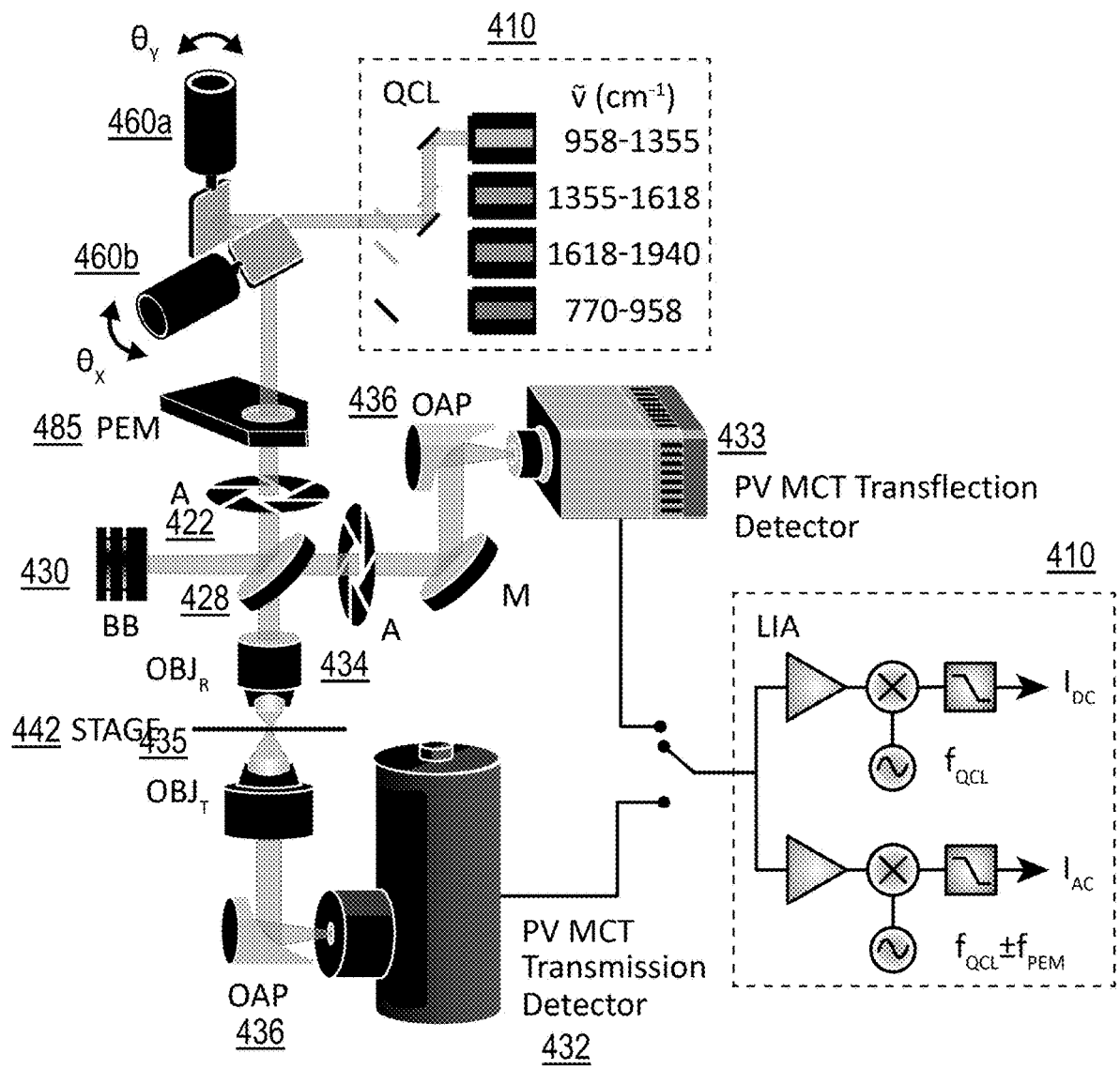
FIG. 5 illustrates an example of the detector output of a DFIR QCL-VCD apparatus of FIG. 3A-C or 4, showing the power spectrum resulting in from a retardance of 90° (above) and a retardance of 0° (below); (Note that the ordinate is in dB)

To obtain a VCD spectrum, the polarization of the optical beam is modulated between LCP and RCP states before impinging on the sample. The recorded differential intensity between RCP and LCP signal is denoted by $I_{AC}$, which is the magnitude of the demodulated complex signal at the difference or sum frequency ($f_{QCL} \pm f_{PEM}$), where $f_{PEM}$ is the PEM's resonant frequency. Likewise, the signal acquired at the QCL's pulse repetition rate ($f_{QCL}$) is denoted by $I_{DC}$. IR absorbance (A) is calculated as the negative log of $I_{DC}$, whereas $I_{AC}$ is scaled by $I_{DC}$ to derive the VCD signal, as described in EQs. 8 and 9, using a phase-sensitive lock-in amplifier (LIA) or the equivalent. FIG. 5 depicts the power spectrum of the acquired signal. For simplification purposes, substitute $$\frac{I_{DC}(\tilde{v})}{I_{DC}^0(\tilde{v})} = I_{DC},$$

and separately denote the sample and background intensities as $I_s$ and $I_{BG}$, respectively, where $I_s(f_{QCL}) = I_{DC}(f_{QCL}, \tilde{v})$ and $I_{BG}(f_{QCL}) = I_{DC}^0(f_{QCL}, \tilde{v})$.

$$A = -\log_{10}\frac{I_s(f_{QCL})}{I_{BG}(f_{QCL})} = -\log_{10}(I_{DC}) \quad (8)$$

$$VCD = \frac{I_s(f_{QCL} \pm f_{PEM}) - I_{BG}(f_{QCL} \pm f_{PEM})}{I_s(f_{QCL})/I_{BG}(f_{QCL})} = \frac{I_{AC}}{I_{DC}} \quad (9)$$

The IR absorption and VCD spectra thus acquired are background subtracted to correct for instrument effects such as scattering. The filter time constant and the noise bandwidth are parameters that affect the SNR of any phase-sensitive detectors such as the LIA. The time constant may be adjusted to provide an optimal balance of responsiveness and stability ($\tau = t_x/C$) for a particular modality of use and, in imaging mode, may be set relative to the minimum pixel dwell time ($t_x$), scaled by a lock-in specific parameter (C). Depending on the low-pass filter order, the response time for the LIA measurement reaches a steady state value in its rated steady state multiple, denoted as $C_T$. By increasing the time constant, the noise in the output signal value is reduced, but with a consequent trade-off in system responsiveness and acquisition speed.

In the transflection configuration, the Mueller matrix for a low-emissivity slide can be approximated as an ideal mirror, $M_M(\tilde{v})$. A polarizer (0°) is added after the sample and the absorbance and VCD signals are acquired simultaneously as shown in FIG. 5. For measuring the vibrational circular birefringence (VCB) intensity, a polarization analyzer (45°) can be placed just after the sample such that the VCB component can be isolated at twice the PEM frequency $f_{QCL} \pm 2f_{PEM}$.

$$I_{T,VCB}(\tilde{v}) = M_D M_P(45°) M_X(\tilde{v}) M_{PEM}(f_{PEM}, \tilde{v}) M_P(0°) S_0(f_{QCL}, \tilde{v}) = \quad (10)$$

$$\frac{I_0(\tilde{v})}{4} 10^{-A''(\tilde{v})}(1 + 2J_1[\alpha_M^0(\tilde{v})]CD(\tilde{v}) - 2J_2[\alpha_M^0(\tilde{v})]CB(\tilde{v})),$$

Similarly, for measuring the vibrational linear dichroism (VLD) intensity, a polarization analyzer (0°) can be placed just after the sample such that the VLD component can be isolated at twice the PEM frequency $f_{QCL} \pm 2f_{PEM}$.

$$I_{T,VLD}(\tilde{v}) = M_D M_P(0°) M_X(\tilde{v}) M_{PEM}(f_{PEM}, \tilde{v}) M_P(0°) S_0(f_{QCL}, \tilde{v}) = \quad (11)$$

$$\frac{I_0(\tilde{v})}{4} 10^{-A''(\tilde{v})}(1 + 2J_1[\alpha_M^0(\tilde{v})]CD(\tilde{v}) - 2J_2[\alpha_M^0(\tilde{v})]LD(\tilde{v})),$$

Figure 10:
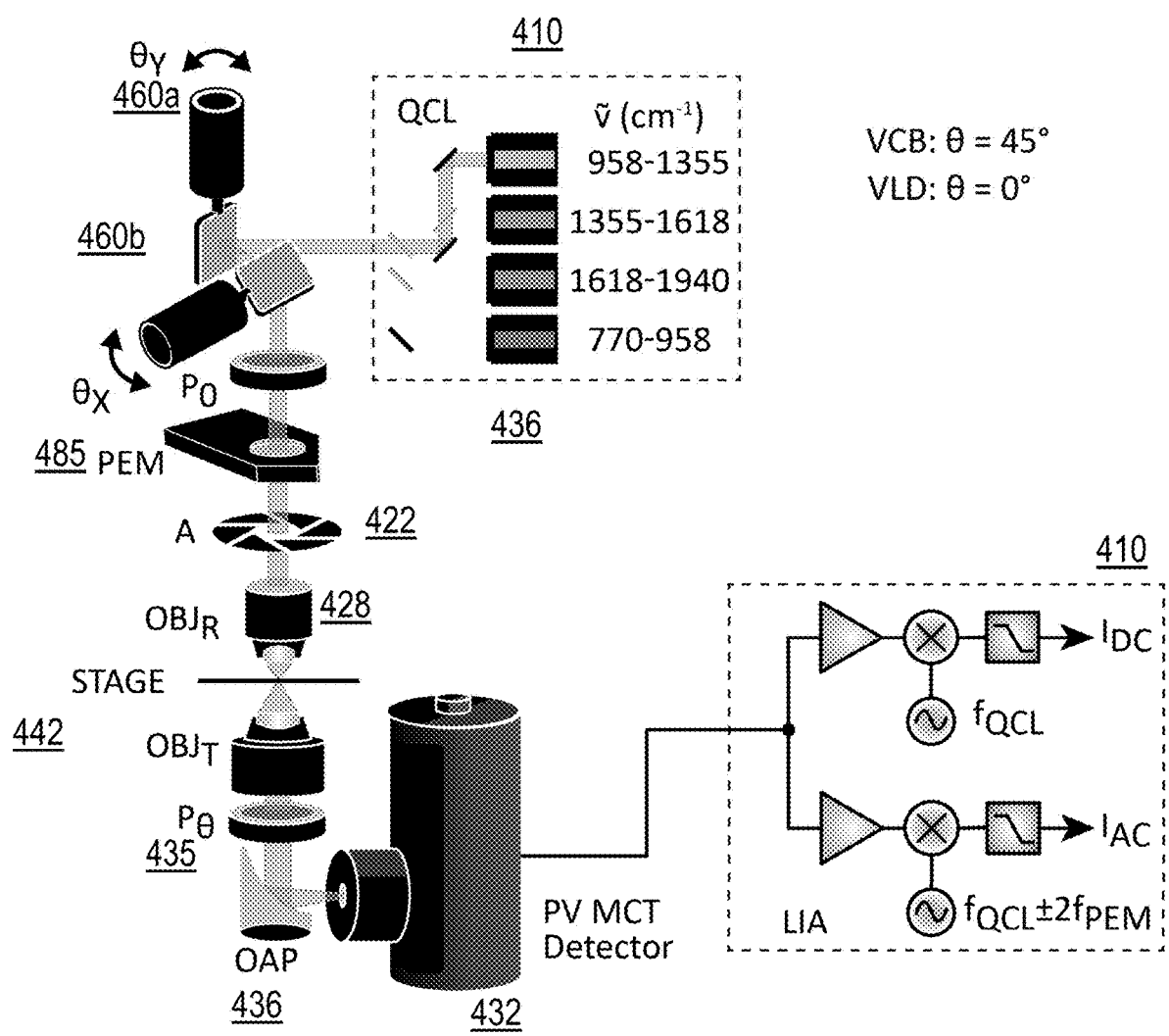
FIG. 10 shows a schematic representation of the changes in a DFIR QCL-VCD microscope to acquire VCB or VLB measurements with PEM polarization control and detection at multiple demodulation frequencies in a transmission configuration.

Both the configurations for acquiring LD and VCB measurements are shown in FIG. 10.

The calibration factor for VCD signal, which directly relates to the Bessel functions $J_2[a_M^0(\tilde{v})]$ and $J_0[a_M^0(\tilde{v})]$) can be acquired using a combination of polarizers and/or a waveplate as shown in FIG. 11A. The retardance of a representative half wave plate with center wavelength of 6 μm as a function of the wavenumber is as shown. The calibration intensity can be derived using the formulation described as follows.

$$I_{T,CAL}(\tilde{v}) = M_D M_P(90°) M_{PEM}(f_{PEM}, \tilde{v}) M_P(0°) S_0(f_{QCL}, \tilde{v}) = \quad (12)$$

$$\frac{I_0(\tilde{v})}{4} 10^{-A''(\tilde{v})}(1 - 2J_2[\alpha_M^0(\tilde{v})] - J_0[\alpha_M^0(\tilde{v})])$$

Figure 12:
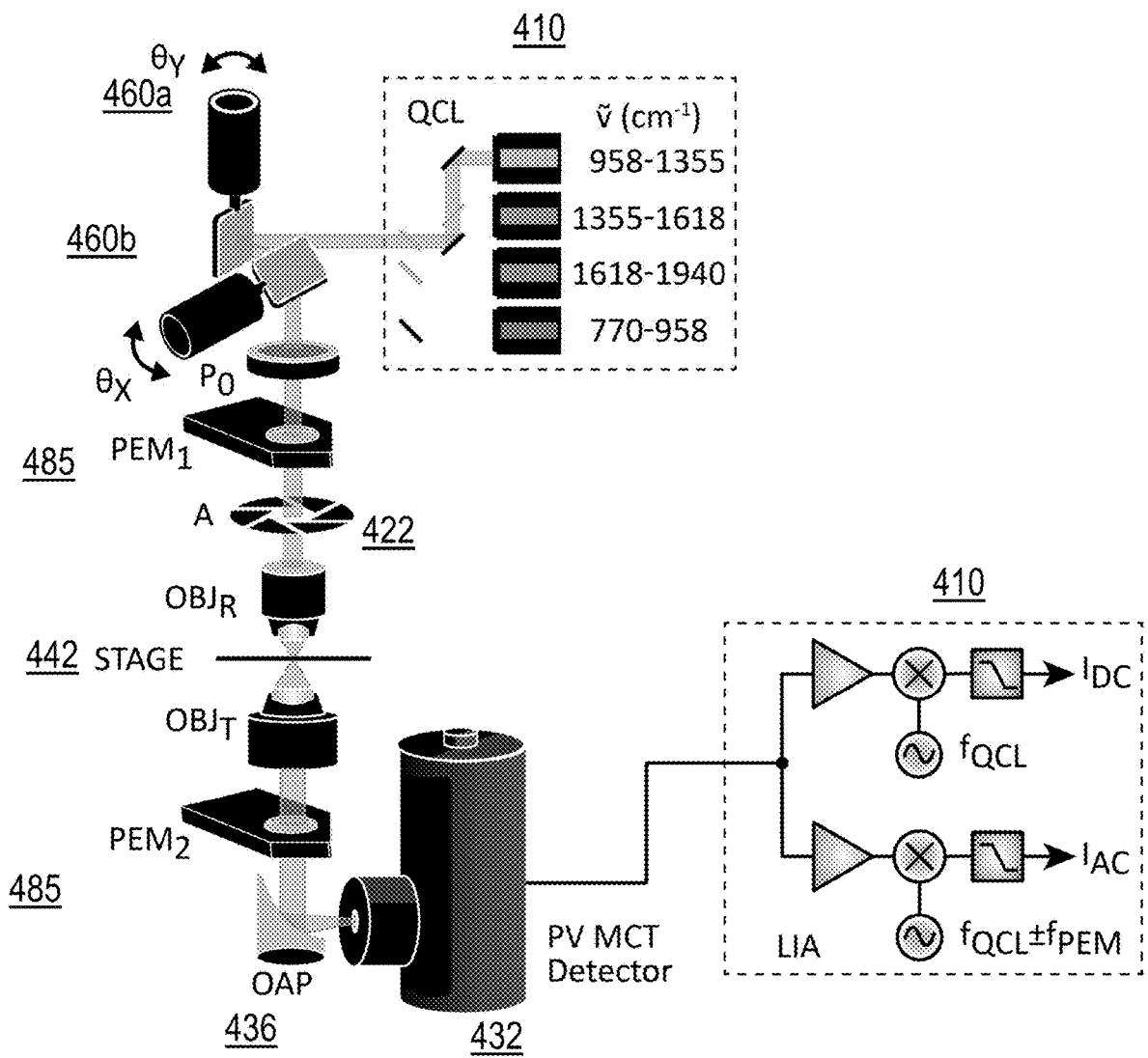
FIG. 12 shows the dual-PEM setup for sensitive measurements with real-time baseline-correction capabilities.

Methods that employ dual PEM offer a systematic way of providing a baseline-corrected VCD spectra without the need for a subsequent VCD background measurement through estimation of Bessel functions and the resulting product terms. It is another way of artifact suppression to acquire intensity calibrated VCD spectrum. Use of two PEMs, one before and one just after the sample helps in providing a baseline-corrected VCD spectrum with minimal contributions from linear birefringence, specifically arising from the sample cells with birefringent windows. The optical configuration is shown in FIG. 12. The calibration intensity can be derived as follows using the formulation described earlier. Note that the detector is assumed to be polarization sensitive such that the different contributions arising along x and y axes (oriented at θ with respect to optical axis) are defined by $p_x$ and $p_y$.

$$I_{T,CAL}(\tilde{v}) = \quad (13)$$
$$M_D(\theta)M_{PEM}(f_{PEM,2}, \tilde{v})M_X(\tilde{v})M_{PEM}(f_{PEM,1}, \tilde{v})M_P(0°)S_0(f_{QCL}, \tilde{v}) =$$
$$\frac{I_0(\tilde{v})}{4}10^{-A''(\tilde{v})}(1 + 2J_1[\alpha_M^1(\tilde{v})]CD(\tilde{v}) + (p_x^2 - p_y^2)\cos(2\theta)$$
$$[-2J_1[\alpha_M^1(\tilde{v})]J_0[\alpha_M^2(\tilde{v})]LB - 2J_0[\alpha_M^1(\tilde{v})]J_1[\alpha_M^2(\tilde{v})]\ LB])$$

An example of the operational control and processing steps that may be used to obtain the VCD spectra is described, but the description is not intended to limit in any way the use of alternative signal processing techniques, which are known to be used for determining spectral properties of a signal, including phase. Using the apparatus and techniques disclosed herein, linear dichroism (LD) and vibrational circular birefringence (VCB) and other polarization measurements that can help in formulating the complete Mueller matrix of the sample can be acquired.

While the discussion of the DFIR QCL-VCD microscope has been presented in terms of a transmission-type modality, the same considerations would apply in a transflection configuration. FIG. 5 shows an example of an alternate embodiment that combines the capabilities to perform both transflection and transmission measurements. Generally, the preparation of the sample will determine which measurements are to be obtained and the specific operational parameters in each instance.

The beam splitter 428, beam block 430, an aperture 426 and a detection capability for the transflection measurements are also added. The LIA 432 is shown as being switched between the transflection and transmission optical configurations, however this is not a limitation and signals from both modes could be processed simultaneously.

As development of multi-channel QCL chips consisting of larger arrays become more prevalent, this may exceed capabilities feasible with lock-in amplifiers (LIA), but would be well within the capability of a digital signal processing system, including but not limited to any filtering techniques, comprising an analog-to-digital converter interfaced to a processor that algorithmically emulates the functions of a lock-in amplifier. This demodulation process is also known as coherent or homodyne detection and is not limited to lock-in amplifiers but any analog and/or digital circuits that are based on the concept of phase-locked detection. The description is not intended to limit in any way the use of alternative signal processing techniques, which are known to be used for determining spectral properties of an electrical signal, including phase.

Figure 6:
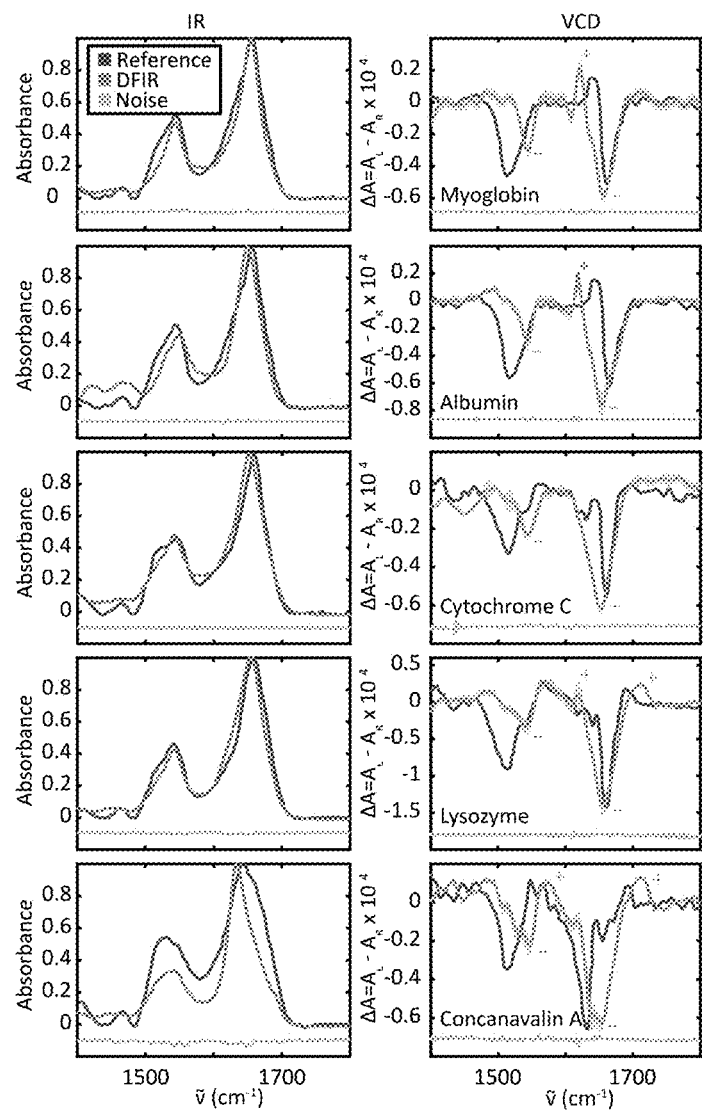
FIG. 6 comprises charts comparing fingerprint IR absorption spectra from reference samples and the simultaneously acquired corresponding VCD spectra of five representative proteins.

VCD spectra have been used in biopolymer structural studies. For globular proteins, the Amide I and Amide II vibrational modes, absorption features are widely used as a marker for relative conformational composition, due to their higher intensities and increased sensitivity to secondary structures compared to the amide III band. Hence, the analysis of VCD spectra in the mid-IR is usually limited to the spectral range 1400-1800 $cm^{-1}$. Commonly, α-helix secondary structures are associated with 1650-1655 $cm^{-1}$. 1633-1640 $cm^{-1}$ is used as indicative of β-sheet, while an absorption between 1670-1690 $cm^{-1}$ and a characteristic band around 1665 $cm^{-1}$ is assigned to β-turns, and random coil is usually associated with the IR band between 1640 and 1648 $cm^{-1}$. We have used representative proteins, namely, Myoglobin, Bovine Serum Albumin (BSA), Cytochrome C, Lysozyme and Concanavalin A to validate our measurements. In FIG. 6, we compare the absorption spectra of the representative proteins in DFIR-VCD configuration with the spectra obtained from literature using other techniques. The DFIR-VCD spectra acquired for the corresponding protein secondary structures show a high correlation with the FT-IR spectra and is in accordance with the Pearson statistics, with a significance value above 0.93.

The recorded spectra show that the secondary structure determines the dominant contributions to the VCD shape. A comparison of the VCD spectra demonstrates considerable similarities with respect to unique peak locations, yet there are also significant differences. The VCD spectra of proteins with dominant α-helix structures such as Myoglobin (70%) and Bovine Serum Albumin (BSA) have a characteristic +/− couplet with zero-crossing at 1630 $cm^{-1}$ in the Amide-I region with a distinct negative band. They also have a distinct intense negative VCD band in the Amide-II region as seen in FIG. 6. Concanavalin A (45%) is a protein with dominant β-sheets structure. The amide I band shows a −/+ couplet and an intense negative band located at 1660 $cm^{-1}$, which is the typical signature of the β-sheets structure. It is opposite to the characteristic signature of α-helical structure in the Amide-I region. In the amide II region, a characteristic intense −/+ couplet is observed. Cytochrome C and Lysozyme are proteins with α-helical (40%), β-turns (20%) and β-sheets structures. They show the characteristic +/− couplet for helical structures with smaller intensity. However, due to the cancellation of the opposite bands in the Amide-I region, they are the most difficult to isolate. They also have a broader and less intense negative band in the Amide-II region. To summarize, the Amide-I region in all the representative proteins show high correlation with FT-IR VCD spectra, with some frequency shifts in the positive lobe of the Amide-I and the Amide-II. Moreover, Amide-II shows a broad negative peak for α-helical structures such as Myoglobin and is bisignate for β-sheet such as Concanavalin A. These results confirm the association between FT-IR- and DFIR VCD-derived protein spectra. Moreover, for the proteins with a mix of helices and sheets, the positive shoulder at 1690 $cm^{-1}$ could be indicative of some β-degree turn or anti-parallel β-sheet structure. The VCD spectra generated on protein films is similar to spectra generated in solution form.

Thus, we have shown that DFIR-VCD spectra can be recorded in a microscopy configuration in feasible times (each spectrum took ~2 min to acquire). Implementation of VCD in an DFIR microscope permits examining human tissues or other materials for chirality and the potential association of this characteristic with normal physiologic functions or with disease. As a preliminary investigation to assess VCD images, we have examined colon tissue samples in a configuration that is common in diagnostic pathology. To our knowledge, this is the first example of data acquired by a QCL-based IR imaging microscope designed to simultaneously collect absorbance and VCD images.

Using the disclosed apparatus, we have demonstrated rapid pixel mapping to form hyperspectral absorption and VCD images of colon tissue with spectral steps of 4 $cm^{-1}$. FIG. 9 is a black and white representation of false color DFIR-VCD transmission mode images of (A) Infrared Amide 1 (1648 cm$^{-1}$) absorption, (B) 1632 cm$^{-1}$ VCD, (C) 1664 cm$^{-1}$ VCD, and (D) corresponding H&E-stained images of four samples from tissue microarray (TMA) with normal (I5) and various grades of malignant (B12, G5, B6) colon tissue cores. The alphabetic and numeric identifier for each image corresponds to the row and column of the TMA respectively. All scale bars are 250 µm;

FIG. 10 shows a schematic representation of the changes in a DFIR QCL-VCD microscope to acquire VCB or VLB measurements with PEM polarization control and lock-in detection at multiple demodulation frequencies in a transmission configuration.

Linear dichroism (LD) is the differential absorption between two orthogonal, linearly polarized states. LD is a measurement of the sample's bulk property that is a result of the regular orientation of the molecules in the sample. The PEM can be set to the half-wave retardance mode such that the light beam is modulated between two perpendicular polarization states. When incident on the sample, the differential measurements can be acquired at the modulator's second harmonic ($2f_{PEM}$) that describes the LD of the sample. The angles θ in FIG. 10 refer to the orientation of the analyzer, i.e., the polarizer at the detection side 435.

Figure 13:
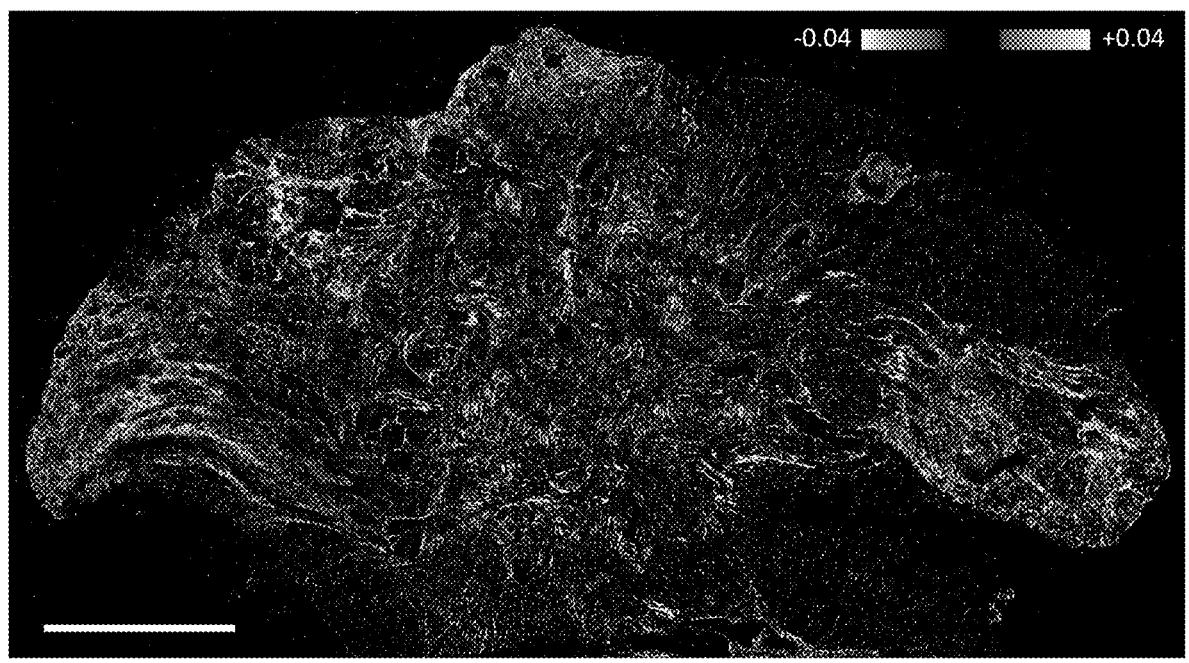
FIG. 13 is a black and white representation of a VCD image acquired at 1632 cm$^{-1}$ of a breast surgical tissue section. Scale bar is 1 mm.

FIG. 11A shows the calibration setup using a combination of polarizers and/or a waveplate. FIG. 11B shows the half-wave plate (center wavelength of 6 µm) retardance dependence on the incident IR wavelength and the compatible wavelength range. FIG. 11C shows the acquired time series data and the estimated fit using a combination of polarizers. FIG. 12 shows the dual-PEM setup for sensitive measurements with real-time baseline-correction capabilities; and FIG. 13 is a black and white representation of a false-color VCD image acquired at 1632 cm$^{-1}$ of a breast surgical tissue section illustrating features that could be useful in research and diagnosis. Scale bar is 1 mm.

The embodiments of the apparatus described above, or variants thereof whose configuration will be understood by persons of skill in the art, may be used in methods of obtaining the data for a pixel or a plurality of pixels. The data may be for intensity, VCD, VCB, VLD, or the like, and may be used as the basis for the characterization of the Muller matrix of a sample for quality assurance, for research and for diagnosis.

FIG. 9 illustrates a simple connectivity diagram of a DFIR spectrometer as disclosed herein. A light beam from the laser source is intrinsically or extrinsically modulated at a pulse repetition rate and routed by a first group of optical components 525 to be imaged on a sample 426 that may be mounted on a stage 442. Light emitted from the sample 442 is routed to a photodetector 432 by a second group of optical components 550.

The detected electrical signal is demodulated by demodulator 410, as has previously been described.

The first group of optical components 525 may include galvanometer mirrors 460a, 460b a polarization modulator, which may be a PEM or other such device, and a lens to image the light beam onto the sample 422. In a transmission mode (such as in FIG. 3A), light is transmitted from the surface opposite that that which is illuminated by the first group of optical components 525, and is collected and routed to a detector 432 by a second group of optical components 550. The detected light is an electrical signal that is processed by the detector 410, as has been previously described. The electrical signal from the detector 432 is routed to at least a first demodulator 410a and a second demodulator 410b that recover a signal at a one of a laser pulse frequency or a polarization modulation frequency or multiple thereof.

The location on the sample illuminated by the pulsed, polarization modulated laser beam may be determined as well by controlling the motion of the mechanical stage 442, with or without the use of galvanometer mirrors 460a, 460b.

In addition to controlling the entire apparatus to collect the data, the control device 300 may store the data obtained and assemble the plurality of pixel values into an image.

When operating in a transflection mode, (such as in FIG. 5), the second group of optical components 550 collects light transflected or reflected from the surface of the sample 426 that is illuminated by the first group of optical components 525 and routes the light to the detector 432. In this configuration, the first group of optical components 525 and the second group of optical components 550 share at least one optical component, which may the beam splitter 428. The DFIR microscope may be configured such that both modalities may be employed.

Thus, a method 900 of obtaining a DFIR pixel value may include (FIG. 9): generating, by a laser source, a pulsed beam, comprising a spectral frequency and a pulse repetition rate (910); modulating a polarization state of the pulsed laser beam to include multiple polarization states (which may be right-hand circular (RHC) and left-hand circular (LHC) polarization) at a one or more modulation frequency (920); transmitting, by a first group of optical components, the pulsed, modulated laser beam onto a location of a sample (930); collecting, by a first group of optical components, the pulsed, modulated laser beam energy emitted from the location of the sample and directing the light energy onto a photodetector to produce a raw electrical signal (940); demodulating, by one or more demodulators based on the pulse repetition rate or the modulation frequency, the raw electrical signal to obtain one or more intensity values corresponding to the location of the sample (950, 960) (where such intensity values may be related, for example, the VCD, VCB or VLD); and determining, by a control device (300) comprising a memory storing executable instructions and a processor, based on the determined intensity values, a pixel value corresponding to the spectral frequency in a DFIR spectroscopic image corresponding to the location of the sample (970).

The methodological schema described above may be utilized with the various device configurations previously described to obtain data for locations on the sample representing the intensity, VCD VCB and VLD of the location and may be used as pixels to form images of a sample area for each of the modalities.

While the disclosure has included reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the claims will cover any such modifications and alternate embodiments. Accordingly, the disclosure and the figures are to be regarded as illustrative rather than restrictive.

The invention claimed is:

1. A method for obtaining a discrete frequency infrared (DFIR) spectroscopic image for a sample, the method comprising:

generating, by a laser source, a laser beam comprising a spectral frequency;
modulating the laser beam in intensity or phase at a first modulation frequency;
modulating the polarization state of the laser beam to include at least two polarization states at a second modulation frequency;
transmitting, by a first group of optical components, the modulated pulsed laser beam onto a location of a sample;
collecting, by a second group of optical components, optical signal transmitted or transflected from the location of the sample onto a photodetector to obtain an electric signal;
demodulating, by a first demodulator, based on the first modulation frequency, the electric signal to obtain a first intensity value corresponding to the location of the sample;
demodulating, by a second demodulator, based on at least the second modulation frequency, the electrical signal to obtain a second intensity value corresponding to the location of the sample; and
determining, by a control device comprising a processor and a non-volatile memory, storing computer executable instructions in communication with the non-volatile memory, based on the first intensity value, a first pixel value of a DFIR spectroscopic image corresponding to the location of the sample; and based on at least the second intensity value, a second pixel value of a DFIR image corresponding to a same location of the sample.

2. The method according to claim 1, further comprising:
determining, by the control device, a plurality of pixel values corresponding to the spectral frequency of the DFIR spectroscopic image based on a plurality of intensity values of at least a plurality of locations of the sample by at least one of the following:
positioning, by a movable electro-mechanical stage holding the sample, the plurality of locations on the sample relative to the laser beam; or
steering, by at least one rotatable or tiltable optical element in the first group of optical components, the laser beam relative to plurality of locations on the sample.

3. The method of claim 1, wherein two polarization states of at least two polarization states are right-hand circular (RHC) and left-hand circular (LHC) polarization.

4. The method of claim 1, wherein the first modulation frequency is a pulse repetition rate.

5. The method of claim 1, wherein demodulating, by a second demodulator, is based on a frequency that is the sum or difference frequency between the first modulation frequency and the second modulation frequency.

6. The method according to claim 1, wherein:
at least one of the first demodulator or the second demodulator is a lock-in amplifier (LIA).

7. The method according to claim 1, wherein:
at least one of the first demodulator or the second demodulator comprises a coherent demodulator.

8. The method according to claim 7, wherein the coherent demodulator comprises a step of using an analog-to-digital converter to digitize the electrical signal and processing the digitized electrical signal by a processor to determine the first or the second intensity value.

9. The method according to claim 1, further comprising: computing a third intensity value for each pixel as the ratio of the second intensity value to the first intensity value.

10. The method according to claim 1, wherein, the first group of optical components and the second group of optical components comprise at least one common optical component.

11. The method of claim 10, wherein the variable voltage-controlled waveplate is a photoelastic modulator (PEM).

12. The method of claim 1, wherein modulating the polarization state of the pulsed laser beam includes:
providing a variable voltage-controlled waveplate capable of introducing at retardance of least one-quarter of a wavelength of the beam emitted by the laser source.

13. The method of claim 1, wherein modulating the polarization state of the pulsed laser beam includes:
providing a variable voltage-controlled waveplate capable of introducing at retardance of least one-half of a wavelength of the beam emitted by the laser source.

14. The method of claim 1, wherein the optical signal is transmitted on the opposite surface of the sample from the location on the sample being illuminated by the laser beam.

15. The method of claim 1, wherein the first pixel value is a measure of absorption and the second pixel value is a measure of vibrational circular dichroism.

16. The method of claim 1, wherein the sample comprises an enantiomeric substance exhibiting chirality; or, a biological sample.

17. The apparatus according to claim 16, wherein, the first group of optical components and the second group of optical components share a common optical component and the apparatus is configured operate in an epi-illumination mode.

18. The apparatus according to claim 16, wherein the apparatus is configured to operate in a transmission mode.

19. The apparatus according to claim 16, wherein at least one of the first or the second demodulators is a lock-in amplifier (LIA).

20. The apparatus according to claim 16, wherein at least one of the first or the second demodulators comprises an analog-to-digital converter to convert the raw electrical signal to a digital format that is coherently detected using the processor executing stored computer readable instructions.

21. The apparatus of claim 16, wherein the first reference frequency is the pulse repetition rate and the second reference frequency is the sum or difference frequency of the pulse repetition rate and the modulating frequency.

22. An apparatus for obtaining a discrete frequency infrared (DFIR) intensity measurement for a sample using polarized light, the apparatus comprising:
a laser source module configured to emit a laser beam having a spectral frequency and a pulse repetition rate;
a first group of optical components configured to transmit the pulsed laser beam onto a location of a sample, including a photoelastic modulator (PEM) capable of introducing at retardance of least one-quarter of a wavelength of the beam emitted by the laser source;
a second group of optical components configured to collect an optical signal transmitted from the location of the sample onto a photodetector to obtain first electric signal;
a first demodulator configured to demodulate the electrical signal based on a first reference frequency, to obtain a first intensity value corresponding to the location of the sample;
a second demodulator configured to demodulate the electrical signal, based on a second reference frequency to obtain a second intensity value corresponding to the location of the sample and a control device, including a processor and a non-volatile memory, configured to determine, based on the first intensity value and the second intensity value, a first pixel value and a second pixel value corresponding to the location of the sample.

\* \* \* \* \*

UNITED STATES PATENT AND TRADEMARK OFFICE
CERTIFICATE OF CORRECTION

PATENT NO. : 11,499,910 B2
APPLICATION NO. : 17/377096
DATED : November 15, 2022
INVENTOR(S) : Yamuna Phal, Kevin Lee Yeh and Rohit Bhargava It is certified that error appears in the above-identified patent and that said Letters Patent is hereby corrected as shown below:

In the Specification

In Column 14, Lines 46-47, delete "“eq Error! Ref-erence source not found" and replace with --equation (2)--

In Column 15, Line 8, delete "eq Error! Reference source not found" and replace with --equation (3)--

In Column 15, Line 12, after the equation, insert justified right --(3)--

In Column 15, Line 14, please delete "$CD = \frac{1}{2}\ln(10)\,[A_L(\tilde{v}) - A_R(\tilde{v})] = 1.1513\Delta\lambda_{VCD}(\tilde{v}),$" and replace with --$CD = \frac{1}{2}\ln(10)\,[A_L(\tilde{v}) - A_R(\tilde{v})] = 1.1513\Delta A_{VCD}(\tilde{v}),$--

Figure 7:
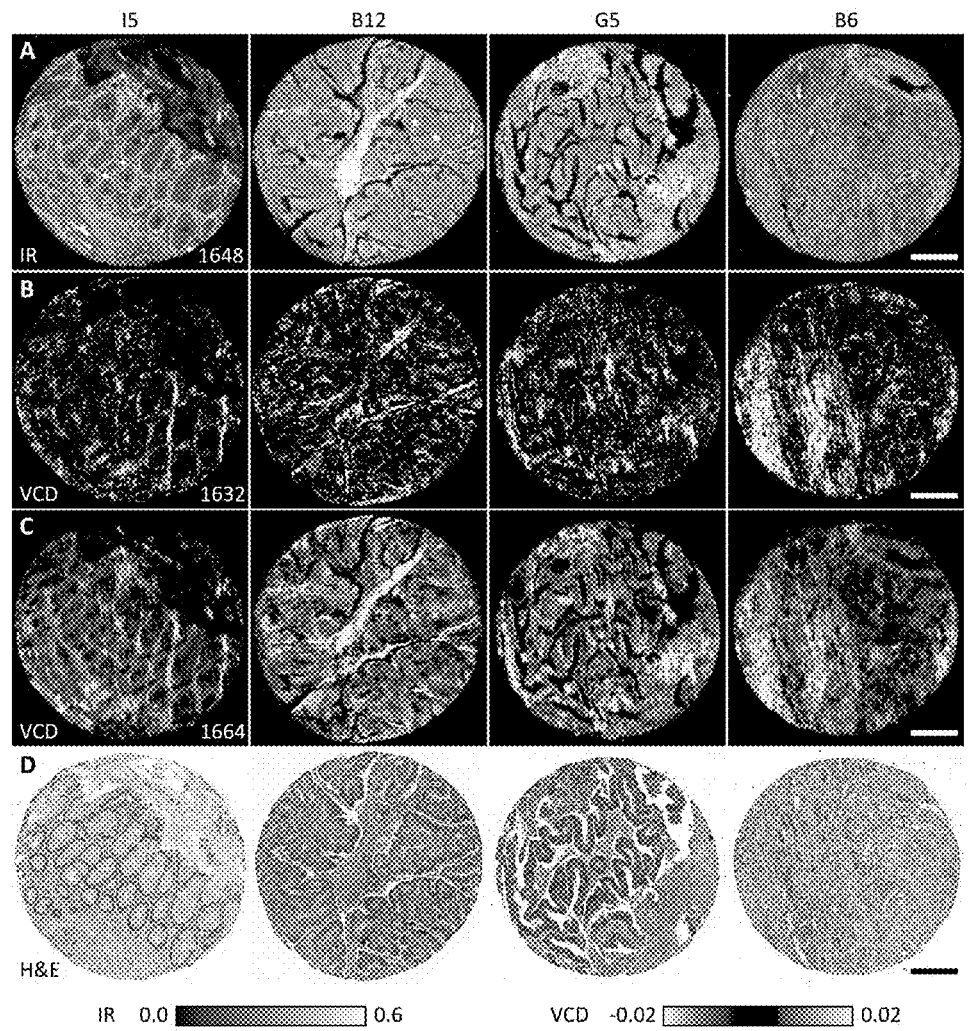
FIG. 7 is a black and white representation of false color DFIR-VCD transmission mode images of human tissue compared with a H&E-stained sample and a non-VCD image.

In Column 18, Line 67, please delete "Fig. 9" and replace with --Fig. 7--

In Column 19, Line 2, please delete "Amide 1" and replace with --Amide I--

Figure 8:
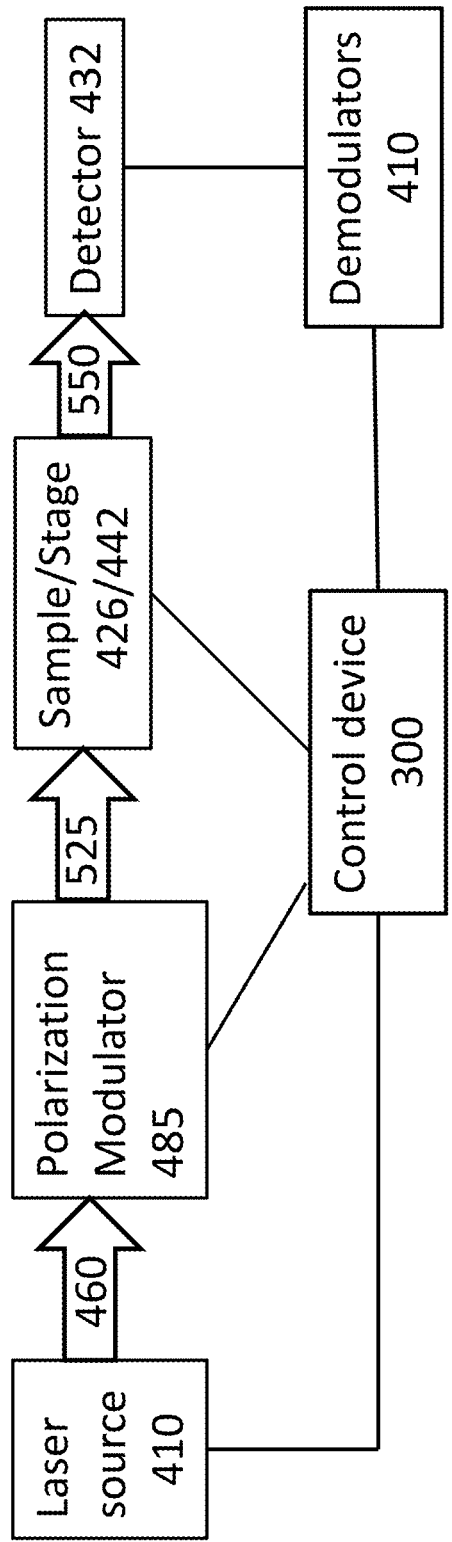
FIG. 8 is a simplified diagram of the optical paths and the data processing and control paths.

In Column 19, Line 46, please delete "Fig. 9" and replace with --Fig. 8--

Signed and Sealed this
Thirtieth Day of May, 2023

Katherine Kelly Vidal
*Director of the United States Patent and Trademark Office*